(12) United States Patent
Wildgoose et al.

(10) Patent No.: US 10,861,687 B2
(45) Date of Patent: Dec. 8, 2020

(54) SEPARATING IONS IN AN ION TRAP

(71) Applicant: Micromass UK Limited, Wilmslow (GB)

(72) Inventors: Jason Lee Wildgoose, Stockport (GB); Keith Richardson, High Peak (GB); David J. Langridge, Macclesfield (GB); Martin Raymond Green, Bowdon (GB); Steven Derek Pringle, Darwen (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 15/568,601

(22) PCT Filed: Apr. 25, 2016

(86) PCT No.: PCT/GB2016/051159
§ 371 (c)(1),
(2) Date: Oct. 23, 2017

(87) PCT Pub. No.: WO2016/170371
PCT Pub. Date: Oct. 27, 2016

(65) Prior Publication Data
US 2018/0151339 A1    May 31, 2018

(30) Foreign Application Priority Data

| Apr. 23, 2015 | (GB) | ................................. | 1506906.5 |
| Apr. 23, 2015 | (GB) | ................................. | 1506908.1 |
| Apr. 23, 2015 | (GB) | ................................. | 1506909.9 |

(51) Int. Cl.
*H01J 49/00* (2006.01)
*H01J 49/42* (2006.01)
*G01N 27/62* (2006.01)

(52) U.S. Cl.
CPC ............ *H01J 49/004* (2013.01); *G01N 27/62* (2013.01); *H01J 49/427* (2013.01); *H01J 49/4235* (2013.01)

(58) Field of Classification Search
CPC ...... H01J 49/00; H01J 49/004; H01J 49/0081; H01J 49/02; H01J 49/025; H01J 49/06;
(Continued)

(56) References Cited

U.S. PATENT DOCUMENTS

| 5,206,506 A | 4/1993 | Kirchner |
| 6,504,148 B1 * | 1/2003 | Hager ................... H01J 49/004 250/281 |

(Continued)

FOREIGN PATENT DOCUMENTS

| EP | 2065917 A1 | 6/2009 |
| EP | 1704578 B1 | 4/2011 |

(Continued)

OTHER PUBLICATIONS

International Search Report and Written Opinion for International Application No. PCT/GB2016/051159 dated Sep. 7, 2016, 26 pages.
(Continued)

*Primary Examiner* — Jason L McCormack

(57) ABSTRACT

A method is disclosed comprising: trapping ions in an ion trap (40); applying a first force on the ions within the ion trap in a first direction, said force having a magnitude that is dependent upon the value of a physicochemical property of the ions; applying a second force on these ions in the opposite direction so that the ions separate according to the physicochemical property value as a result of the first and second forces; and then pulsing or driving ions out of one or more regions of the ion trap.

11 Claims, 11 Drawing Sheets

(58) Field of Classification Search
CPC ...... H01J 49/062; H01J 49/063; H01J 49/065; H01J 49/066
USPC .......................... 250/281, 282, 283, 286, 290
See application file for complete search history.

(56) References Cited

U.S. PATENT DOCUMENTS

| | | |
|---|---|---|
| 7,838,826 B1 | 11/2010 | Park |
| 8,395,112 B1* | 3/2013 | Bier ....................... G01N 21/53 250/281 |
| 2002/0070338 A1 | 6/2002 | Loboda |
| 2003/0213903 A1* | 11/2003 | Ichimura ............. G01N 27/622 250/282 |
| 2005/0253064 A1* | 11/2005 | Loboda ................. H01J 49/062 250/292 |
| 2007/0034810 A1* | 2/2007 | Hoyes ................... H01J 49/427 250/396 R |
| 2009/0134321 A1* | 5/2009 | Hoyes ................... H01J 49/004 250/282 |
| 2009/0173877 A1* | 7/2009 | Bateman .............. G01N 27/622 250/282 |
| 2012/0256083 A1* | 10/2012 | Kovtoun ............... H01J 49/004 250/282 |
| 2012/0273673 A1* | 11/2012 | Park ..................... G01N 27/624 250/283 |
| 2013/0009051 A1* | 1/2013 | Park ..................... H01J 49/063 250/282 |
| 2013/0306858 A1* | 11/2013 | Giles ....................... H01J 49/36 250/283 |
| 2014/0326870 A1* | 11/2014 | Makarov ................. H01J 49/06 250/283 |
| 2015/0060656 A1* | 3/2015 | Ugarov ................. H01J 49/061 250/282 |
| 2016/0126074 A1* | 5/2016 | Green ................. H01J 49/0031 250/282 |
| 2016/0231275 A1* | 8/2016 | Park ..................... G01N 27/622 |
| 2017/0213716 A1* | 7/2017 | Wildgoose ............ H01J 49/062 |

FOREIGN PATENT DOCUMENTS

| | | |
|---|---|---|
| GB | 2421844 A | 7/2006 |
| GB | 2515617 A | 12/2014 |
| WO | 2005/106922 A1 | 11/2005 |
| WO | 2007/010272 A2 | 1/2007 |
| WO | 2013/005058 A1 | 1/2013 |
| WO | 2013/027054 A2 | 2/2013 |
| WO | 2013/092923 A2 | 6/2013 |
| WO | 2014/140546 A2 | 9/2014 |

OTHER PUBLICATIONS

International Preliminary Report on Patentability for International Application No. PCT/GB2016/051159 dated Oct. 24, 2017, 21 pages.
Search Report for GB Application No. GB1506908.1 dated Feb. 5, 2016.
Search Report for GB Application No. GB1506906.5 dated Dec. 23, 2015.
Search Report for GB Application No. GB1506909.9 dated Dec. 16, 2015.
Communication pursuant to Article 94(3) EPC for EP Application No. EP16718903.4, dated Aug. 27, 2020, 7 pages.

* cited by examiner

SEPARATING IONS IN AN ION TRAP

CROSS-REFERENCE TO RELATED APPLICATION

This application claims priority from and the benefit of United Kingdom patent application No. 1506909.9 filed on 23 Apr. 2015, United Kingdom patent application No. 1506906.5 filed on 23 Apr. 2015, and United Kingdom patent application No. 1506908.1 filed on 23 Apr. 2015. The entire contents of each of these applications are incorporated herein by reference.

FIELD OF THE INVENTION

The present invention relates generally to mass and/or ion mobility spectrometers and methods of mass and/or ion mobility spectrometry. Embodiments of the invention relate to an ion filter for filtering ions according to a physicochemical property, a method and apparatus for improving the resolution of ion mobility measurements, and a method and apparatus for improving the duty cycle of a discontinuous ion analyser such as a time of flight (ToF) mass analyser.

BACKGROUND TO THE PRESENT INVENTION

A first set of embodiments of the present invention relate to an ion filter. There are many situations in mass spectrometry where a low resolution or poor quality mass to charge ratio filter is desired. For example, a low pass mass filter may be used to limit the range of mass to charge ratios entering a Time of Flight (ToF) mass analyser so as to remove the effect of so called "wrap around". Also, high pass mass filters (sometimes called the low mass cut-off filters) are often used to clean up the parent and daughter ion data in $MS^e$ "shotgun" experiments, i.e. experiments that periodically fragment parent ions and alternate between a parent ion analysis mode and a daughter ion analysis mode. However, it is desired to provide an improved method of filtering ions and an improved ion filter.

A second set of embodiments of the present invention relate to improving the resolution of ion mobility measurements. The maximum resolution of a drift time ion mobility separator (IMS) is proportional to the square root of the length of the drift path and the electrical field. For example, an increase of a factor of four is required in either parameter to gain an increase in resolution of a factor of two. It is desired to provide an improved method of ion mobility separation and an IMS device having an improved resolution.

A third set of embodiments of the present invention relate to improving the duty cycle of a discontinuous ion analyser. It is known to mass selectively eject ions from an ion trap into a pusher region of a time of flight (ToF) mass analyser so as to time focus a given range of mass to charge ratios within the pusher and hence increase the duty cycle of the analyser. It is also known to use an ion mobility separator to temporally separate ions upstream of a ToF mass analyser, and then synchronise the pusher of the ToF analyser with the arrival times of the ions from the ion mobility separator. However, this method is generally only suitable for use with ions of a single charge state, as the ion mobility separation results in the temporal separation of ions of different charge states. It is also known to release ions from a small, low resolution TOF region into a travelling wave ion guide. The velocity of the travelling wave along the ion guide is controlled such that the required mass ranges may be separated temporally and introduced into the pusher region of a TOF mass analyser so as to increase the duty cycle of the mass analyser. However, the velocity requirements for the travelling wave may result in significant fragmentation of ions at low mass to charge ratios. It is desired to provide and improved method and apparatus for improving the duty cycle of a discontinuous ion analyser such as a time of flight (ToF) mass analyser.

SUMMARY

From a first aspect the present invention provides a method of filtering ions according to at least one physicochemical property, comprising:

trapping ions in an ion trap; and then spatially separating the ions within the ion trap according to said at least one physicochemical property so that ions become distributed within the ion trap according a known, determined or estimated physicochemical property distribution so that ions having different values of said physicochemical property are trapped in different regions of the ion trap;

selecting a desired first value, or first range of values, of said physicochemical property for first ions desired to be ejected from the ion trap;

determining a first region of the ion trap in which said first ions are located from said known, determined or estimated physicochemical property distribution; and then driving or pulsing first ions trapped in said region out of the ion trap.

The present invention enables one to select the physicochemical property values of the ions that are driven out of the ion trap at said any one time, thereby filtering the ions. The present invention also alleviates space-charge effects since the ions are distributed in the ion trap according to the physicochemical property.

WO 2005/106922 discloses a device for mass selectively ejecting ions by applying opposing forces to the ions using DC and AC electric fields and then varying the forces such that ions are ejected in order of mass to charge ratio. However, according to this technique, the physicochemical property distribution along the device is not known, determined or estimated. Accordingly, this technique does not determine the region in which ions having a selected value, or range of values, of the physicochemical property are located based on a known, determined or estimated physicochemical property distribution, and then driving or pulsing ions trapped in this region out of the ion trap. Rather, in WO '922 there is no step of determining the location of the region in which ions desired to be ejected are located. This is because the ions are mass selectively scanned out of the device and so the ions ejected at any given time are always located adjacent the exit of the device. These differences arise because, in contrast to the embodiments of the present invention, the device in WO '922 does not filter ions so as to selectively transmit only ions of interest. Rather, all ions are scanned out of the device in WO '922.

US 2002/0070338 discloses separating ions according to ion mobility, halting the ion mobility separation and then raising a series of potential wells along the length of the device so as to lock in the ion mobility separation. The ions are then sequentially ejected by opening the potential wells in sequence, starting at the exit end of the device. However, according to this technique the ions are not spatially separated after being trapped in an ion trap. Also, the physicochemical property distribution along the device is also not known, determined or estimated. Consequently, this technique does not determine the region in which ions having a selected value, or range of values, of the physicochemical property are located based on a known, determined or estimated physicochemical property distribution, and then driving or pulsing ions trapped in this region out of the ion trap. Rather, in US'338 the ions are always released from the trapping region at the exit of the device.

According to the method of said first aspect, ions trapped in the other of said different trapping regions may remain trapped in those regions during said driving or pulsing of said first ions out of the ion trap.

For example, where the ion trap has a longitudinal axis and the ions are distributed along the axis according to the physicochemical property values, the other ions may remain trapped at their respective axial positions whilst the first ions are driven or pulsed out of the ion trap and, optionally, until said other ions are driven or pulsed out of the ion trap.

A voltage supply may apply voltages to the ion trap so as to cause the ions to remain trapped in their respective trapping regions during said driving or pulsing of said first ions out of the ion trap.

The method may comprise selecting a desired value, or range of values, of said physicochemical property for second ions desired to be ejected from the ion trap;

determining a second different region of the ion trap in which said second ions are located from said known, determined or estimated physicochemical property distribution; and then driving or pulsing the second ions trapped in said second region out of the ion trap.

The method of ejecting may be repeated for driving or pulsing third, fourth or additional groups of ions out of respective third, fourth or additional regions of the ion trap.

The different groups of ions may be ejected from the ion trap at a different times from each other.

The method may comprise driving or pulsing ions trapped in only one of said different regions out of the ion trap at any one time.

Accordingly, said step of spatially separating the ions may cause ions having the first value, or first range of values, for said physicochemical property to be trapped in the first region and ions having a second value, or second range of values, for said physicochemical property to be trapped in a second of said different regions; and said step of driving or pulsing ions may drive or pulse only said ions having the first value, or first range of values, for said physicochemical property out of the ion trap, at a first time.

The method may comprise driving or pulsing only said ions having the second value, or second range of values, for said physicochemical property out of the ion trap, at a second later time.

The method may further comprise performing one or more further cycle of operation, wherein each cycle comprises: driving or pulsing trapped ions out of one of said regions of the ion trap, whilst retaining other ions trapped in other regions of the ion trap; wherein for each subsequent cycle of operation, ions are driven or pulsed out of a different region of the ion trap from the previous cycles of operation.

For each subsequent cycle of operation, ions may be driven or pulsed out of the ion trap from a trapping region that is further away from the exit of the ion trap than the region from which ions were driven out in the previous cycle of operation.

The ion trap may comprise an elongated ion trapping volume, and ions having said different values of said physicochemical property may be trapped in different regions along the longitudinal axis of the ion trap.

The ions having said different values of said physicochemical property may be trapped in the ion trap at different distances from the exit of the ion trap prior to being driven out of the ion trap from said exit.

The ion trap may have a longitudinal axis and said region from which the ions are driven or pulsed out of may not be a region adjacent an exit at a longitudinal end of the ion trap.

The ions may be spatially separated within the ion trap according to the at least one physicochemical property so that the ions are dispersed along the ion trap according to their physicochemical property values without the spatially separated trapped ions being separated by potential barriers.

The step of spatially separating the ions may not therefore comprise arranging a potential barrier, such as a DC potential barrier, between the ions of different physicochemical property values. In this context, such a potential barrier is intended to mean a discrete barrier or well, rather than a potential gradient.

The ion trap may comprise an elongated ion guide having a plurality of electrodes arranged along its longitudinal axis. This allows one or more voltage supply to apply different AC and/or DC voltages to different axial locations of the ion trap, for example, in order to radially confine the ions and/or generate the DC gradient and/or generate the pseudo-potential and/or generate the travelling potential described herein.

The ion trap may comprise a plurality of apertured electrodes within which the ions are trapped by application or AC and/or DC voltages to the electrode. For example, the ion trap may comprise a stacked ring ion guide or an ion tunnel ion guide. Less preferably, the ion trap may comprise one or more multipole rod sets.

The ion trap may comprise geometries of electrodes other than those described above.

The step of separating the ions may cause the ions to be arranged in order of the physicochemical property within the ion trap, either in a manner wherein the value increases or decreases in a direction towards the exit of the ion trap.

The ions of different physicochemical property values may be spatially separated over a length of ≥x mm within the ion trap, wherein x is selected from the group consisting of: 1, 1.5, 2, 2.5, 3, 3.5, 4, 4.5, 5, 6, 7, 8, 9, and 10.

The step of spatially separating the ions may comprise applying a first force on the ions within the ion trap in a first direction, said force having a magnitude that is dependent upon the value of said at least one physicochemical property of the ions; and applying a second force on these ions in the opposite direction; optionally wherein the magnitude of said second force is not dependent upon the value of said at least one physicochemical property of the ions.

Optionally, said first and second forces are counterbalanced at different locations within the ion trap for ions having different physicochemical property values, such that different ions are trapped at said different regions.

The ion trap comprises one or more electrodes and said method may comprise generating said first force by applying AC or RF potentials to said electrodes so as to generate a pseudo-potential electric field that urges ions in the first direction.

The ion trap comprises one or more electrodes and said method may comprise generating said second force by applying one or more DC potentials to said one or more electrodes so as to generate a DC voltage or DC voltage gradient that urges ions in the second direction; and/or a gas flow may be provided through the ion trap so as to generate said second force.

When said step of spatially separating the ions comprises separating the ions according to more than one physicochemical property, the ions are separated so that ions having different combinations of values for said more than one physicochemical property are trapped in different regions within the ion trap.

The step of driving or pulsing trapped ions out of a region of the ion trap may comprise varying an electrical potential along the trapping region that ions are being driven or pulsed out of; and/or travelling an electric potential along at least a portion of the ion trap so as to drive the ions out of the ion trap.

The method may comprise varying the electrical potential profile along the first region when driving or pulsing ions out of the first region and/or varying the electrical potential profile along a second different region when driving or pulsing ions out of the second region.

As described above, the method may comprise a series of cycles in which ions are driven out of different ones of said regions in successive cycles. In each cycle, ions may be driven out of the region of the ion trap by travelling an electric potential along at least a portion of the ion trap.

The electric potential may be travelled along a first length of the ion trap in order to drive or pulse the first ions out of the first region of the ion trap at a first time, and an electric potential may be subsequently travelled along a second length of the ion trap in order to drive second ions out of a second of said different regions of the ion trap at a second time.

The first and second lengths of the ion trap may be overlapping. The first length may be shorter than the second length, and the second length may include at least part of the first length.

The first length may extend from a first location in the ion trap to the exit of the ion trap, whereas the second length extends from a second location in the ion trap to the exit of the ion trap, wherein the second location is further from the exit than the first location.

The electric potential may be travelled along third and further lengths of the ion trap at subsequent times in order to drive ions out of third and further ones of said different regions of the ion trap. Preferably, the electric potential repeatedly travels from an upstream location of the ion trap towards the exit of the ion trap, wherein the upstream location becomes progressively further upstream as time progresses.

Optionally, the electric potential(s) that is travelled along the ion trap is a DC potential barrier or well.

Ions driven or pulsed from regions that are not regions of interest may be discarded or neutralised, whereas selected ions of interest may be onwardly transmitted for mass and/or ion mobility analysis.

The method comprises calculating or determining a correlation between the physicochemical property values of the ions and their locations within the ion trap; selecting a value, or range of values, of said physicochemical property for ions desired to be ejected from the ion trap; using said correlation to select one of said different regions of said ion trap in which ions having that physicochemical property value, or range of values, are trapped; and driving ions out of that selected region.

Ions of interest having the selected value, or range of values, of said physicochemical property may be ejected from the ion trap and transmitted to an ion analyser, or ion storage device. For example, the ion analyser may be a mass analyser or ion mobility analyser.

Unwanted ions having a value, or range of values, of said physicochemical property that are not of interest may be ejected or released from the ion trap and/or are discarded or neutralised.

For example, the ion trap may be operated as a high pass filter and ions trapped in the ion trap having physicochemical property values below a first threshold value may be ejected or released from the ion trap and discarded or neutralised.

Alternatively, the ion trap may be operated as a low pass filter and ions trapped in the ion trap having physicochemical property values above a second threshold value may be ejected or released from the ion trap and discarded or neutralised.

Alternatively, the ion trap may be operated as a band pass filter and ions trapped in the ion trap having physicochemical property values below a first threshold value and above a second threshold value may be ejected or released from the ion trap and discarded or neutralised.

The unwanted ions may be discarded by travelling a DC voltage along the portion of the ion trap in which these unwanted ions are trapped, so as to force these ions out of the ion trap. Less preferably, the ion trapping voltages may be removed from the regions of the ion trap in which these unwanted ions are stored, e.g. the radial confinement voltages may be removed in these regions.

The method may comprise pulsing ions into the ion trap and then performing the step of separating the ions.

The ion trap may be an elongated ion trap and the step of ejecting ions from at least some of said different regions of the ion trap may be performed by axially ejecting the ions from said at least some of said different regions; or the ion trap may be an elongated ion trap and the step of ejecting ions from at least some of said different regions of the ion trap may be performed by radially ejecting the ions from said at least some of said different regions.

Accordingly, the ion trap may have a longitudinal axis and the ions may be driven or pulsed out of a longitudinal end of the ion trap, or maybe radially driven or pulsed out of the ion trap.

Unwanted ions may be radially ejected and desired ions may be axially ejected.

Alternatively, desired ions may be radially ejected and unwanted ions may be axially ejected.

Ions may be ejected from the ion trap in order of physicochemical property value, or reverse order, to a downstream ion analyser; and the operation of the ion analyser may be varied with time.

For example, the downstream ion analyser may be a resolving quadrupole or other multipole in which the mass to charge ratios transmitted by the quadrupole or multipole is scanned with time. Ejecting the ions from the ion trap in order of physicochemical property value, or reverse order, serves to increase the duty cycle of the scanned device.

It is also contemplated that the ions ejected from the ion trap may be fragmented in a collision cell.

The at least one physicochemical property may be mass to charge ratio and/or ion mobility.

The present invention also provides a method of mass spectrometry or ion mobility spectrometry comprising filtering ions according to any of the methods described herein. The method may further comprise mass analysing or ion mobility analysing ions driven out of the ion trap.

The first aspect of the present invention also provides an ion filter for filtering ions according to at least one physicochemical property, comprising:

an ion trap for trapping ions;

an ion separator for spatially separating the ions within the ion trap according to at least one physicochemical property;

an ion driving or pulsing device for driving or pulsing ions out of the ion trap; and a controller having a processor and electronic circuitry adapted and configured to: control the ion trap so as to trap ions therein;

control the ion separator so as to spatially separate the ions within the ion trap according to said at least one physicochemical property so that ions become distributed within the ion trap according a selected physicochemical property distribution so that ions having different values of said physicochemical property are trapped in different regions of the ion trap;

determine a first region of the ion trap in which ions having a preselected first value, or first range of values, of said physicochemical property are located based on said physicochemical property distribution; and then drive or pulse first ions trapped in said region out of the ion trap.

The ion filter may be configured to perform any of the methods described herein. In particular, the controller may control electrical circuitry and at least one voltage supply so as to apply voltages to the filter so as to perform any of the methods described herein.

The present invention also provides a mass spectrometer or ion mobility spectrometer comprising an ion filter as described herein. The spectrometer may comprise a detector for detecting ions driven or pulsed out of the ion trap and/or a mass analyser or ion mobility analyser for analysing ions driven out of the ion trap.

Although the physicochemical property distribution has been described above as a known, determined or estimated physicochemical property distribution, it is contemplated herein that the physicochemical property distribution need not necessarily be known, determined or estimated. Accordingly, the step of selecting a desired first value (or first range of values) of said physicochemical property for first ions desired to be ejected from the ion trap, and the step of determining a first region of the ion trap in which said first ions are located from the known, determined or estimated physicochemical property distribution need not necessarily be performed.

Accordingly, from a second aspect the present invention provides a method of filtering ions according to at least one physicochemical property, comprising:

trapping ions in an ion trap;

spatially separating the ions within the ion trap according to said at least one physicochemical property so that ions having different values of said physicochemical property are trapped in different regions of the ion trap; and then driving ions trapped in one of said different regions out of the ion trap, optionally wherein ions trapped in only one of said different regions are driven out of the ion trap at any one time.

This technique enables one to select the physicochemical property values of the ions that are driven out of the ion trap at said any one time, e.g., by driving ions out of only one of said different regions. This technique also alleviates space-charge effects since the ions are distributed according to the physicochemical property value in the ion trap.

The method of second aspect may comprise any of the features described in relation to the first aspect of the invention.

Optionally, whilst said step of driving ions is performed, other ions remain trapped in the other region(s) of the ion trap.

Ions may be driven out of the ion trap by being pulsed out.

The step of spatially separating the ions may cause ions having a first range of values for said physicochemical property to be trapped in a first of said different regions and ions having a second range of values for said physicochemical property to be trapped in a second of said different regions; and the step of driving ions may drive only said ions having the first range of values for said physicochemical property out of the ion trap, at a first time.

The method may comprise driving only said ions having the second range of values for said physicochemical property out of the ion trap, at a second later time.

The method may further comprise performing one or more further cycle of operation, wherein each cycle comprises: driving trapped ions out of one of said regions of the ion trap, whilst retaining other ions trapped in other regions of the ion trap; wherein for each subsequent cycle of operation, ions are driven out of a different region of the ion trap from the previous cycles of operation.

For each subsequent cycle of operation, ions may be driven out of the ion trap from a trapping region that is further away from the exit of the ion trap than the region from which ions were driven out in the previous cycle of operation.

The ion trap may comprise an elongated ion trapping volume, and ions having said different values of said physicochemical property may be trapped in different regions along the longitudinal axis of the ion trap; and/or the ions having said different values of said physicochemical property may be trapped in the ion trap at different distances from the exit of the ion trap prior to being driven out of the ion trap from said exit.

The ion trap may comprise an elongated ion guide having a plurality of electrodes arranged along its longitudinal axis. This allows different AC and/or DC voltages to be applied at different axial locations of the ion trap, for example, in order to radially confine the ions and/or generate the DC gradient and/or generate the pseudo-potential and/or generate the travelling potential described herein.

The ion trap may comprise a plurality of apertured electrodes within which the ions are trapped by application or AC and/or DC voltages to the electrode. For example, the ion trap may comprise a stacked ring ion guide or an ion tunnel ion guide. Less preferably, the ion trap may comprise one or more multipole rod sets.

The ion trap may comprise geometries of electrodes other than those described above.

The step of separating the ions may cause the ions to be arranged in order of the physicochemical property within the ion trap, either in a manner wherein the value increases or decreases in a direction towards the exit of the ion trap.

The step of spatially separating the ions may comprise applying a first force on the ions within the ion trap in a first direction, said force having a magnitude that is dependent upon the value of said at least one physicochemical property of the ions; and applying a second force on these ions in the opposite direction. Optionally, the magnitude of said second force is not dependent upon the value of said at least one physicochemical property of the ions.

The first and second forces may be counterbalanced at different locations within the ion trap for ions having different physicochemical property values, such that different ions are trapped at said different regions.

The ion trap comprises one or more electrodes and said method may comprise generating said first force by applying AC or RF potentials to said electrodes so as to generate a pseudo-potential electric field that urges ions in the first direction.

The ion trap comprises one or more electrodes and the method may comprise generating said second force by applying one or more DC potentials to said one or more electrodes so as to generate a DC voltage or DC voltage gradient that urges ions in the second direction; and/or a gas flow may be provided through the ion trap so as to generate said second force.

When said step of spatially separating the ions comprises separating the ions according to more than one physicochemical property, the ions are separated so that ions having different combinations of values for said more than one physicochemical property are trapped in different regions within the ion trap.

The step of driving trapped ions out of a region of the ion trap may comprise travelling an electric potential along at least a portion of the ion trap so as to drive the ions out of the ion trap.

As described above, the method may comprise a series of cycles in which ions are driven out of different ones of said regions in successive cycles. In each cycle, ions may be driven out of the region of the ion trap by travelling an electric potential along at least a portion of the ion trap.

Said electric potential may be travelled along a first length of the ion trap in order to drive first ions out of a first of said different regions of the ion trap at a first time, and an electric potential is subsequently travelled along a second length of the ion trap in order to drive second ions out of a second of said different regions of the ion trap at a second time.

The first and second lengths of the ion trap may be overlapping. For example, the first length may be shorter than the second length, and the second length may include the first length.

The first length may extend from a first location in the ion trap to the exit of the ion trap, whereas the second length extends from a second location in the ion trap to the exit of the ion trap, wherein the second location is further from the exit than the first location.

The electric potential may be travelled along third and further lengths of the ion trap at subsequent times in order to drive ions out of third and further ones of said different regions of the ion trap. Optionally, the electric potential repeatedly travels from an upstream location of the ion trap towards the exit of the ion trap, wherein the upstream location becomes progressively further upstream as time progresses.

Optionally, the electric potential(s) that is travelled along the ion trap is a DC potential barrier or well.

The method may comprise calculating or determining a correlation between the physicochemical property values of the ions and their locations within the ion trap; selecting a value, or range of values, of said physicochemical property for ions desired to be ejected from the ion trap; using said correlation to select one of said different regions of said ion trap in which ions having that physicochemical property value, or range of values, are trapped; and driving ions out of that selected region.

Ions of interest having a selected value, or range of values, of said physicochemical property may be ejected from the ion trap and transmitted to an ion analyser, or ion storage device. For example, the ion analyser may be a mass analyser or ion mobility analyser.

Unwanted ions having a value, or range of values, of said physicochemical property that are not of interest may be ejected or released from the ion trap and/or discarded or neutralised.

For example, the ion trap may be operated as a high pass filter and ions trapped in the ion trap having physicochemical property values below a first threshold value may be ejected or released from the ion trap and discarded or neutralised.

Alternatively, the ion trap may be operated as a low pass filter and ions trapped in the ion trap having physicochemical property values above a second threshold value may be ejected or released from the ion trap and discarded or neutralised.

Alternatively, the ion trap may be operated as a band pass filter and ions trapped in the ion trap having physicochemical property values below a first threshold value and above a second threshold value may be ejected or released from the ion trap and discarded or neutralised.

The unwanted ions may be discarded by travelling a DC voltage along the portion of the ion trap in which these unwanted ions are trapped, so as to force these ions out of the ion trap. Less preferably, the ion trapping voltages may be removed from the regions of the ion trap in which these unwanted ions are stored, e.g. the radial confinement voltages may be removed in these regions.

The method may comprise pulsing ions into the ion trap and then performing the step of separating the ions.

The ion trap may be an elongated ion trap and the step of ejecting ions from at least some of said different regions of the ion trap may be performed by axially ejecting the ions from said at least some of said different regions; or the ion trap may be an elongated ion trap and the step of ejecting ions from at least some of said different regions of the ion trap may be performed by radially ejecting the ions from said at least some of said different regions.

Unwanted ions may be radially ejected and desired ions may be axially ejected.

Alternatively, desired ions may be radially ejected and unwanted ions may be axially ejected.

Ions ejected from the ion trap may be ejected in order of physicochemical property value, or reverse order, to a downstream ion analyser; and the operation of the ion analyser may be varied with time. For example, the downstream ion analyser may be a resolving quadrupole or other multipole in which the mass to charge ratios transmitted by the quadrupole or multipole is scanned with time. Ejecting the ions from the ion trap in order of physicochemical property value, or reverse order, serves to increase the duty cycle of the scanned device.

It is also contemplated that the ions ejected from the ion trap may be fragmented in a collision cell.

The at least one physicochemical property may be mass to charge ratio and/or ion mobility.

The present invention also provides a method of mass spectrometry or ion mobility spectrometry comprising filtering ions according to any of the methods described herein. The method may further comprise mass analysing or ion mobility analysing ions driven out of the ion trap.

The second aspect of the invention also provides an ion filter for filtering ions according to at least one physicochemical property, comprising:

an ion trap;

an ion separator;

an ion driving device; and a controller configured to control the ion trap to trap ions therein; control the ion separator so as to spatially separate the ions within the ion trap according to said at least one physicochemical property so that ions having different values of said physicochemical property are trapped in different regions of the ion trap; and then to control the ion driving device so as to drive ions trapped in only one of said different regions out of the ion trap at any one time.

The ion filter may be configured to perform any of the methods described herein. For example, the controller may include a processor, electronic circuitry and at least one voltage supply configured and adapted to perform the methods described herein.

The present invention also provides a mass spectrometer or ion mobility spectrometer comprising an ion filter as described herein. The spectrometer may comprise a mass analyser or ion mobility analyser for analysing ions driven out of the ion trap.

From a third aspect the present invention provides a method of ion mobility spectrometry and/or mass spectrometry comprising:

trapping ions in an ion trapping region;

spatially separating the ions within the ion trapping region according to at least one physicochemical property;

pulsing the separated ions out of the ion trapping region and into an ion mobility separator, wherein ions that have been separated from each other in the spatially separating step are pulsed out of the ion trapping region and into the ion mobility separator in the same ion pulse; and separating the ions pulsed into the ion mobility separator according to ion mobility.

As the ions are separated within the ion trapping region, ions of any given physicochemical property value become confined within a relatively small region within the ion trapping region. As such, when the ions are pulsed into the ion mobility separator (IMS), the initial ion pulse width for an ion of any given physicochemical property value is relatively narrow even if a relatively large ion trapping region is used. This enables a large population of ions to be injected into the IMS device without degrading the resolution of the device.

The method may comprise detecting the ions that exit the ion mobility separator so as to determine their ion mobilities.

The step of pulsing the ions out of the ion trapping region may comprise pulsing all ions out of the ion trapping region in a single pulse.

The step of spatially separating the ions may cause ions having different values of said physicochemical property, or different ranges of values of said physicochemical property, to be trapped at different locations within the ion trapping region; and/or ions having different values of said physicochemical property, or different ranges of values of said physicochemical property, may be pulsed out of the ion trapping region from different locations within the ion trapping region during said pulsing step.

When said step of spatially separating the ions comprises separating the ions according to more than one physicochemical property, the ions are separated so that ions having different combinations of values for said more than one physicochemical property are trapped at different locations within the ion trapping region.

The ion trapping region may comprise a linear ion trap or the ion trapping region may be elongated; and ions may be spatially separated along the longitudinal axis of the ion trapping region during the step of spatially separating the ions.

The method may comprise spatially separating the ions after all of the ions to be pulsed into the ion mobility separator in said pulse have been accumulated; or spatially separating the ions whilst the ions are being accumulated in the ion trapping region.

The at least one physicochemical property may be mass to charge ratio and/or ion mobility.

The method may comprise performing a plurality of cycles of operation, wherein each cycle comprises the steps of: (i) receiving and trapping ions in the ion trapping region; (ii) spatially separating the ions according to the at least one physicochemical property within the ion trapping region; and (iii) pulsing the ions out of the ion trapping region and into an ion mobility separator, wherein ions that have been separated from each other in step (ii) are pulsed out of the ion trapping region and into the ion mobility separator in the same ion pulse.

The step of spatially separating the ions may comprise applying a first force on the ions within the ion trapping region in a first direction, said force having a magnitude that is dependent upon the value of said at least one physicochemical property of the ions; and applying a second force on these ions in the opposite direction. Optionally, the magnitude of said second force is not dependent upon the value of said at least one physicochemical property of the ions.

The first and second forces may be counterbalanced at different locations within the ion trapping region for ions having different physicochemical property values, such that different ions are trapped at said different locations.

The ion trapping region may comprise a plurality of electrodes and the method may comprise generating said first force by applying AC or RF potentials to said electrodes so as to generate a pseudo-potential electric field that urges ions in the first direction.

The ion trapping region may comprise one or more electrodes and the method may comprise generating said second force by applying one or more DC potentials to said one or more electrodes so as to generate a DC voltage or DC voltage gradient that urges ions in the second direction. Alternatively, or additionally, a gas flow may be provided through the ion trapping region so as to generate said second force.

Optionally, the ions having different physicochemical property values, or different ranges of physicochemical property values, are not separated from each other in the ion trapping region by a potential barrier such as a DC potential barrier. In this context, the potential barrier is intended to mean a discrete barrier or well, rather than a substantially continuous potential gradient.

The ion trapping region may be formed by an ion trapping device comprising a stacked ring ion guide, ion tunnel, or multipole rod set electrode.

Voltages may be applied to the ion trapping device such that ions are trapped within the ion trapping device in three dimensions.

The method may comprise travelling an electric potential along the ion mobility separator so as to drive ions out of the ion trapping region and into the ion mobility separator during said pulsing step. Optionally, the electric potential may be travelled along the ion trapping region at a constant speed.

The third aspect of the present invention also provides an ion mobility spectrometer and/or mass spectrometer comprising:

an ion trap for trapping ions;

a spatial separator for spatially separating the ions within the ion trap;

an ion mobility separator for separating ions according to their ion mobility;

a pulsing device for pulsing ions out of the ion trap; and a controller arranged and adapted to control the spectrometer to:

operate the spatial separator so as to separate the ions within the ion trap according to at least one physicochemical property;

pulse the separated ions out of the ion trap and into the ion mobility separator, such that the ions that have been separated from each other are pulsed out of the ion trap and into the ion mobility separator in the same ion pulse; and separate the ions in the ion mobility separator.

The spectrometer may comprise a detector for detecting the ions that exit the ion mobility separator so as to determine their ion mobilities.

The ion trap may be a linear ion trap or an elongated ion trap; and the controller may be arranged and adapted to cause ions to be spatially separated along the longitudinal axis of the ion trap.

The spectrometer may be arranged and adapted to perform any of the methods described herein.

Embodiments provide an improvement in ion mobility resolution ($\Omega/\Delta\Omega$) for a given IMS geometry. Currently, the maximum resolution of an IMS device is proportional to the square root of the length of the drift path and the electrical field. Therefore an increase of a factor of four is required in either parameter to gain an increase in resolution of a factor of two.

By spatially separating the ions in a trapping device prior to injection into the IMS device it is possible to increase the resolution by over a factor of 5. Additionally, space-charge effects are minimised during the injection of ions into the IMS device.

From a fourth aspect the present invention provides a method of mass spectrometry and/or ion mobility spectrometry comprising:

trapping ions in an ion trap; and then spatially separating the ions within the ion trap according to at least one physicochemical property so that ions having different values of said physicochemical property are trapped in different regions of the ion trap; and then driving or pulsing first trapped ions out of a first region of the ion trap and into a discontinuous ion analyser at a first time, whilst retaining other ions trapped in the ion trap;

analysing said first ions in a first cycle of said discontinuous ion analyser;

driving or pulsing second trapped ions out of a second, different region of the ion trap and into the discontinuous ion analyser at a second, subsequent time; and analysing said second ions in a different cycle of said discontinuous ion analyser.

It will be appreciated that a discontinuous ion analyser is an ion analyser that analyses ions in a sequence of cycles, rather than continuously. For example, a Time of Flight mass analyser is a discontinuous ion analyser that receives ions in an ion extraction region and periodically pulses them into the time of flight region to a detector for mass analysis. Each pulse to the detector is a separate cycle of analysis.

Conventional arrangements may store ions in an ion trap upstream of a discontinuous ion analyser and then pulse all of the ions from the ion trap into the ion analyser in a single pulse. Using such an ion trap may improve the duty cycle of the instrument, for example, by converting a continuous ion beam into a pulsed ion source. However, if the ions in the ion trap have a relatively wide range of physicochemical property values then they may not all be able to be analysed in the same cycle by a discontinuous ion analyser, resulting in a lower duty cycle. For example, when a group of ions having a wide range of mass to charge ratios is pulsed into a ToF mass analyser, the ions of different mass to charge ratio spread temporally such that not all of the ions are present in the pusher region when the extraction pulse is applied. This leads to a lower duty cycle. Also, conventional methods of trapping ions upstream of the ion analyser lead to detrimental space-charge effects.

The present invention enables a population of ions having a relatively broad range of physicochemical property values (e.g. mass to charge ratios) to be stored in an ion trap and analysed in a discontinuous analyser, whilst maintaining a high duty cycle. In particular, by separating ions within the ion trap according to a physicochemical property and driving ions out of the ion trap from different regions at different times, the ion analyser receives ions having a relatively small range of physicochemical property values in each analysis cycle. The technique also has relatively low space-charge effects, as the ions are spatially separated within the ion trap.

WO 2007/010272 discloses a mass selective ion trap that is synchronised with a scanned mass filter. Pseudo-potential corrugations may be formed along the length of the ion trap and an axial field may be used to drive ions against these corrugations. As ions of different mass to charge ratios experience different forces from the pseudo-potential corrugations, ions may be ejected in reverse order of mass to charge ratios by sweeping the RF potentials applied to the ion trap. Ions are therefore mass selectively scanned out of the ion trap as a continuous stream. However, until the ions are ejected they remain trapped together and are not spatially separated within the ion trap according to a physicochemical property so that ions having different values of the physicochemical property are trapped in different regions of the ion trap. As such, the space-charge effects in WO'272 remain relatively high. Also, the instrument is unable to eject pulses of ions from the different regions of the ion trap in order to eject ions having different ranges of physicochemical property, since in WO'272 the different ions are trapped together in the same trapping region.

EP 2065917 discloses a series of ion traps. Ions of different mass to charge ratios may be ejected through a slot in an electrode of each ion trap at different times by scanning the trapping voltages. However, this instrument does not spatially separate the ions within a trap so that ions of different values of a physicochemical property are trapped in different regions of the trap. Rather, it would seem that the different ions would intermix as they oscillate in the RF trapping fields. Also, the instrument does not analyse ions ejected from different trapping regions in different cycles of a discontinuous analyser. There would seem to be no need to pulse ions into a discontinuous analyser in the instrument of EP'917 since a continuous detector may be used in combination with the extraction voltages to determine the mass to charge ratios of the ions. The concept described above of enhancing the duty cycle in a discontinuous analyser is not suggested in EP'917.

U.S. Pat. No. 5,206,506 discloses a plurality of ion guiding channels in which pseudo-potential wells are arranged that manipulate ions in a number of ways. This instrument may lower the potential barrier between adjacent wells in order to separate ions according to mass to charge ratio, although the separated ions are not then pulsed into a discontinuous ion analyser in different cycles of the analyser. This instrument may also be used to mass selectively eject ions from a pseudo-potential well at the end of an ion guiding channel, although this technique is similar to the ion trap in EP 2065917 in that different ions are not trapped in different regions of the well and there is no requirement to use a discontinuous analyser.

According to embodiments of the present invention, said step of driving or pulsing second trapped ions out of the second region of the ion trap may be performed whilst retaining other ions trapped in the ion trap.

The ions may be spatially separated within the ion trap according to the at least one physicochemical property so that the ions are dispersed along the ion trap according to their physicochemical property values without the spatially separated trapped ions being separated by potential barriers. The step of spatially separating the ions may not therefore comprise arranging a potential barrier, such as a DC potential barrier, between the ions of different physicochemical property values. In this context, such a potential barrier is intended to mean a discrete barrier or well, rather than a potential gradient.

Whilst the first and/or second trapped ions are driven or pulsed out of the first and/or second regions of the ion trap, the other trapped ions may be caused to remain trapped at their respective different trapping regions, optionally until said other trapped ions are driven or pulsed out of their respective trapping regions into the discontinuous ion analyser.

Accordingly, whilst the first trapped ions are driven or pulsed out of the first region of the ion trap, the second trapped ions may be caused to remain in said second region until the second trapped ions are driven or pulsed out of the second region into the discontinuous ion analyser at the second time.

The first region may be closer to the exit of the ion trap than the second region.

Although first and second trapped ions have been described as being trapped and then driven or pulsed out of first and second trapping regions, further groups of ions may also be trapped in further trapping regions and then driven or pulsed out of those further trapping regions into the ion analyser. Accordingly, the method may comprise performing one or more further cycle of operation, wherein each cycle comprises: driving or pulsing trapped ions out of a region of the ion trap and into the discontinuous ion analyser, whilst retaining other ions trapped in the ion trap, and analysing the ions driven or pulsed out of the ion trap in a cycle of said discontinuous ion analyser; wherein for each subsequent cycle of operation, ions are driven or pulsed out of a different region of the ion trap from the previous cycles of operation, and the ions that are driven or pulsed out of the ion trap are analysed in a different cycle of said discontinuous ion analyser.

For each subsequent cycle of operation, ions may be driven out of the ion trap from a trapping region that is further away from the ion analyser than the region from which ions were driven out in the previous cycle of operation (e.g. further from the exit of the ion trap).

Optionally, after said step of trapping the ions, ions are not admitted into the ion trap until after said steps of driving said first and second ions out of the ion trap have been performed. Furthermore, ions may not be admitted into the ion trap until after said plurality of cycles of operation have been performed.

The method may comprise spatially separating the ions only after all of the ions to be analysed in the ion analyser have been accumulated. Alternatively, the step of spatially separating the ions may be performed whilst the ions are being accumulated in the ion trap.

The ion trap may comprise an elongated ion trapping volume, and ions having said different values of said physicochemical property may be trapped in different regions along the longitudinal axis of the ion trap. Alternatively, or additionally, the ions having said different values of said physicochemical property may be trapped in the ion trap at different distances from an entrance to the ion analyser prior to being driven out of the ion trap.

The ion trap may comprise an elongated ion guide having a plurality of electrodes arranged along its longitudinal axis. This allows different AC and/or DC voltages to be applied at different axial locations of the ion trap, for example, in order to apply the DC gradient and/or pseudo-potential and/or travelling potential described herein.

The ion trap may comprise a plurality of apertured electrodes within which the ions are trapped by application or AC and/or DC voltages to the electrode. For example, the ion trap may comprise a stacked ring ion guide or an ion tunnel ion guide. Less preferably, the ion trap may comprise one or more multipole rod sets.

The ion trap may comprise geometries of electrodes other than those described above.

The at least one physicochemical property may be mass to charge ratio and/or ion mobility.

Said step of spatially separating the ions may comprise applying a first force on the ions within the ion trap in a first direction, said force having a magnitude that is dependent upon the value of said at least one physicochemical property of the ions; and applying a second force on these ions in the opposite direction. Optionally, the magnitude of said second force is not dependent upon the value of said at least one physicochemical property of the ions.

Said first and second forces may be counterbalanced at different locations within the ion trap for ions having different physicochemical property values, such that different ions are trapped at said different regions.

Said ion trap may comprise one or more electrodes and said method may comprise generating said first force by applying AC or RF potentials to said electrodes so as to generate a pseudo-potential electric field that urges ions in the first direction.

The ion trap may comprise one or more electrodes and said method may comprise generating said second force by applying one or more DC potentials to said one or more electrodes so as to generate a DC voltage or DC voltage gradient that urges ions in the second direction; and/or a gas flow may be provided through the ion trap so as to generate said second force.

When said step of spatially separating the ions comprises separating the ions according to more than one physicochemical property, the ions may be separated so that ions having different combinations of values for said more than one physicochemical property are trapped at different locations within the ion trapping region.

Each of the steps of driving or pulsing trapped ions out of a region of the ion trap and into a discontinuous ion analyser, whilst retaining other ions trapped in the ion trap, may comprise travelling an electric potential along at least a portion of the ion trap so as to drive the ions out of the ion trap.

The electric potential may be travelled along a first length of the ion trap in order to drive said first ions out of the ion trap, and said electric potential may be subsequently travelled along a second, different length of the ion trap in order to drive said second ions out of the ion trap.

The first and second lengths of the ion trap may be overlapping. The first length may be shorter than the second length, and the second length may include at least part of the first length.

The first length may extend from a first location in the ion trap to the exit of the ion trap, whereas the second length may extend from a second location in the ion trap to the exit of the ion trap, wherein the second location is further from the exit than the first location.

The electric potential may be travelled along third and further lengths of the ion trap in order to drive ions out of the ion trap in the one or more further cycles of operation. Optionally, in each cycle of operation the electric potential travels from an upstream location of the ion guide towards the exit of the ion guide, and wherein the upstream location becomes progressively further upstream in subsequent cycles of operation.

The electric potential that is travelled along the ion guide may be a DC potential barrier or well.

Rather than using a travelling potential to drive ions out of the ion trap in each cycle of operation, one or both of the opposing forces on the ions may be varied with time such that the resulting overall force causes ions to exit the ion guide and enter the discontinuous ion analyser in each cycle of operation. For example, the DC gradient, gas flow rate, or pseudo-potential may be changed to eject different ions in the different cycles of operation.

The discontinuous ion analyser may be a time of flight mass analyser, a pulsed ion mobility analyser, or an Orbitrap® mass analyser.

The ion analyser may be an orthogonal acceleration time of flight mass analyser. However, the ion analyser may be a linear acceleration time of flight mass analyser. The present invention is also applicable to other types of discontinuous ion analyser.

The method may comprise pulsing the ions into the ion trap before the step of separating the ions.

Substantially all of the ions driven out of the ion trap from any given trapping region may be analysed in a single cycle of the discontinuous ion analyser.

Ions having different values, or different ranges of values, for said at least one physicochemical property may be analysed in said ion analyser in different cycles.

The fourth aspect of the present invention also provides a mass spectrometer and/or ion mobility spectrometer comprising:
an ion trap;
an ion separator device;
an ion driving device;
a discontinuous ion analyser; and
a controller arranged and configured to:
trap ions within the ion trap;
control the ion separator device so as to spatially separate the ions within the ion trap according to at least one physicochemical property so that ions having different values for said physicochemical property are trapped in different regions of the ion trap; and then
control the ion driving device so as to drive or pulse first trapped ions out of a first region of the ion trap and into the discontinuous ion analyser at a first time, whilst retaining other ions trapped in the ion trap;
control the discontinuous ion analyser so as to analyse said first ions in a first cycle of analysis;
control the ion driving device so as to drive or pulse second trapped ions out of a second, different region of the ion trap and into the discontinuous ion analyser at a second, subsequent time; and
control the discontinuous ion analyser so as to analyse said second ions in a second cycle of said analysis.

The spectrometer may be arranged and configured to perform any one of the methods described herein.

For example, the ion driving device may be arranged and configured to travel an electric potential along at least a portion of the ion trap so as to drive or pulse ions out of the ion trap; and the controller may be configured to control the ion driving device such that an electric potential is travelled along a first length of the ion trap in order to drive or pulse said first ions out of the ion trap, and an electric potential is travelled along a second length of the ion trap in order to drive or pulse said second ions out of the ion trap.

The discontinuous ion analyser may be a time of flight mass analyser, or a pulsed ion mobility analyser.

Embodiments comprise pulsing ions into an ion trap, and then spatially separating the trapped ions using a combination of opposing DC and pseudo-potential fields. After separation, ions may be extracted from a selected region of the ion trap by travelling a DC potential barrier along the selected region to the exit of the ion trap, so as to urge ions out of the ion trap. The other ions remain trapped in the ion trap. The travelling potential therefore extracts ions from a given spatial range and the ions may be conditioned before passing to the pusher region of a ToF mass analyser. The pusher region pulses these ions into the ToF region and mass analyses them. A travelling potential then sweeps ions out of a different region of the ion trap and into the pusher region of the ToF mass analyser. When these ions are within the pusher region they are pulsed into the ToF region and mass analysed. The process of sweeping ions out of different regions of the ion trap and pulsing them into the ToF region is repeated.

Once ions are pulsed into the ion trap, a period of time is needed to allow the ions to spatially separate. A quantity of time is also required for the ToF mass analysis itself. This time may be used, for example, to analyse incoming ions with a different analyser, e.g. by fragmenting the ions and analysing them in an analytical ion trap.

From a fifth aspect, the present invention provides the ion trap described herein itself. Accordingly, the present invention provides an ion trap for spatially separating ions according to a physicochemical property, wherein the ion trap comprises:
a plurality of electrodes;
at least one AC or RF voltage supply;
at least one DC voltage supply and/or a pump for pumping gas through the ion trap;
and
a controller and circuitry arranged and configured to:
control the at least one AC or RF voltage supply so as to apply one or more AC or RF voltages to said electrodes so as to generate a pseudo-potential electric field that urges ions in a first direction;
control the at least one DC voltage supply so as to apply one or more DC voltages to said electrodes so as to generate a DC electric field that urges ions in a second direction opposite to the first direction, and/or control the pump so as pump gas through the ion trap so as to urge ions in a second direction opposite to the first direction;
control the DC voltage supply and/or pump and/or AC/RF voltage supply so as to pulse or drive ions out of one or more regions of the ion trap.

The ion trap may comprise any of the features described herein, e.g., as described above in relation to the other aspects.

For example, the ion trap may comprise an elongated ion trapping volume; and in use ions having different values of said physicochemical property may be trapped in different regions along the longitudinal axis of the ion trap, and/or ions having different values of said physicochemical property may be trapped in the ion trap at different distances from an exit of the ion trap.

The ion trap may have a longitudinal axis and said one or more regions from which the ions are driven or pulsed from may not be a region adjacent an exit at a longitudinal end of the ion trap.

The ions may be spatially separated within the ion trap according to the physicochemical property so that the ions are dispersed along the ion trap according to their physicochemical property values without the spatially separated trapped ions being separated by potential barriers.

The present invention also provides a method of operating an ion trap as described herein in order to separate and eject ions. Accordingly, the fifth aspect of the present invention provides a method comprising:

trapping ions in an ion trap;

applying a first force on the ions within the ion trap in a first direction, said force having a magnitude that is dependent upon the value of a physicochemical property of the ions;

applying a second force on these ions in the opposite direction so that the ions separate according to the physicochemical property value as a result of the first and second forces; and then pulsing or driving ions out of one or more regions of the ion trap.

The method of trapping and separating ions may comprise any of the features described herein, e.g., in relation to the other aspects described above.

For example, the magnitude of said second force may not be dependent upon the value of said at least one physicochemical property of the ions.

The ion trap may comprise one or more electrodes and the method may comprise generating said first force by applying AC or RF potentials to said electrodes so as to generate a pseudo-potential electric field that urges ions in the first direction.

The ion trap may comprise one or more electrodes and said method may comprise generating said second force by applying one or more DC potentials to said one or more electrodes so as to generate a DC voltage or DC voltage gradient that urges ions in the second direction; and/or a gas flow may be provided through the ion trap so as to generate said second force.

The step of driving or pulsing trapped ions out of a region of the ion trap may comprise varying an electrical potential along the trapping region that ions are being driven or pulsed out of; and/or travelling an electric potential along at least a portion of the ion trap so as to drive the ions out of the ion trap.

The method may comprise varying the electrical potential profile along a first region of the ion trap when driving or pulsing ions out of the first region and/or varying the electrical potential profile along a second different region of the ion trap when driving or pulsing ions out of the second region.

The ion trap may be an elongated ion trap and the step of ejecting ions from at least some of said different regions of the ion trap may be performed by axially ejecting the ions from said at least some of said different regions; or the ion trap may be an elongated ion trap and the step of ejecting ions from at least some of said different regions of the ion trap may be performed by radially ejecting the ions from said at least some of said different regions.

The at least one physicochemical property may be mass to charge ratio and/or ion mobility.

In the method, spectrometer or ion trap according to the various embodiments of the present invention, the ions of different physicochemical property values may be spatially separated over a length of ≥x mm within the ion trap, wherein x is selected from the group consisting of: 1, 1.5, 2, 2.5, 3, 3.5, 4, 4.5, 5, 6, 7, 8, 9, 10, 12, 14, 16, 18, 20, 25, 30, 35, 40, 45 and 50.

Ions having any given value for said physicochemical property may be distributed over ≤y mm within the ion trap, wherein y is selected from the group consisting of: 0.5, 0.6, 0.7, 0.8, 0.9, 1, 1.2, 14.4, 1.6, 1.8, 2, 2.5, 3, 3.5, 4, 4.5, 5, 6, 7, 8, and 9.

Any one of the above ranges for x mm may be combined with any one of the above ranges for y mm. Both of these distances are measured along the axis of separation (i.e. the z-direction). It is desired that the range of ions is separated over a relatively large distance x mm, but that ions of any given value for said physicochemical property are distributed over a relatively small distance y mm.

Optionally, the physicochemical property value may be mass to charge ratio, the ions may be separated such that they are dispersed over a length L in the ion trap, and the ratio of the range of mass to charge ratios, in Daltons, trapped in the ion trap over length L to the length L over which the ions are trapped, in mm, may be selected from the group consisting of: (i) 5-6; (ii) 6-7; (iii) 7-8; (iv) 8-9; (v) 9-10; (vi) 10-11; (vii) 11-12; (viii) 12-13; (ix) 13-14; (x) 14-15; (xi) 15-16; (xii) 16-17; (xiii) 17-18; (xiv) 18-19; and (xv) 19-20.

The separation of the ions according to said physicochemical property may be preserved during ejection of the ions from the ion trap.

Features described in relation to any one of the aspects of the present invention may be used in combination with the method or apparatus of any other of the aspects described herein.

The spectrometer described herein may comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wen filter; and/or (k) a device or ion gate for pulsing ions; and/or (l) a device for converting a substantially continuous ion beam into a pulsed ion beam.

The spectrometer may comprise an electrostatic ion trap or mass analyser that employs inductive detection and time domain signal processing that converts time domain signals to mass to charge ratio domain signals or spectra. Said signal processing may include, but is not limited to, Fourier Transform, probabilistic analysis, filter diagonalisation, forward fitting or least squares fitting.

The spectrometer may comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The spectrometer may comprise a chromatography or other separation device upstream of an ion source. The chromatography separation device may comprise a liquid chromatography or gas chromatography device. The separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <0.0001 mbar; (ii) 0.0001-

0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

BRIEF DESCRIPTION OF THE DRAWINGS

Various embodiments of the present invention will now be described, by way of example only, and with reference to the accompanying drawings in which.

DETAILED DESCRIPTION

Figure 1:
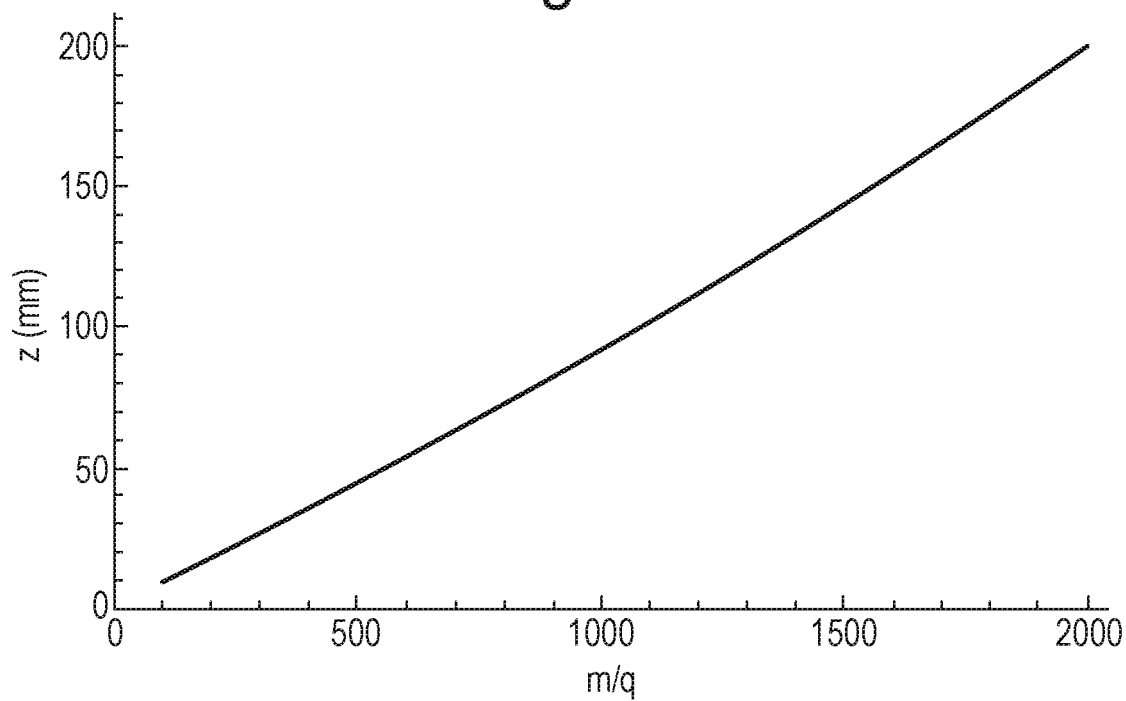
FIG. 1 shows a graph of the positions at which ions of different mass to charge ratio may be trapped within the ion filter of a preferred embodiment of the present invention.

Embodiments of the present invention provide an ion trap that separates ions within the ion trap according to a physicochemical property, e.g., mass to charge ratio.

A first set of embodiments provide a method and apparatus for mass filtering ions by trapping the ions in an ion trap of an ion filtering device, spatially separating the ions within the ion trap according to their mass to charge ratios, and then selectively ejecting ions from one or more sections of the ion trap such that ions having only the desired mass to charge ratios are onwardly transmitted.

A second set of embodiments provide a method and apparatus for improving the resolution of ion mobility measurements by trapping ions in an ion trap, spatially separating the ions within the ion trap according to their mass to charge ratios, and then pulsing the separated ions into an ion mobility separator (IMS) in a single pulse.

A third set of embodiments provide a method and apparatus for improving the analysis of ions in a discontinuous ion analyser by trapping ions in an ion trap, spatially separating the ions within the ion trap according to their mass to charge ratios, and then driving or pulsing ions out of different regions of the ion trap into the discontinuous ion analyser at different times.

The embodiments described herein separate the ions within an ion trap according to mass to charge ratios. The ions may be spatially separated within the ion trap using a combination of a pseudo-potential electric field and a DC electric field. For example, the ion trap may comprise a stacked ring ion guide (or other ion guide) and a controller and related electronic circuitry may control a voltage supply to apply an axial DC voltage $V_{dc}(z)$ along the length of the ion trap having the following profile:

$$V_{dc}(z) = d_1 z + d_2 z^2 \quad \text{(equation 1)}$$

where z is the distance from the end of the ion trap, and $d_1$ and $d_2$ are the coefficients of the linear and quadratic terms.

Similarly, the controller and related electronic circuitry may control a voltage supply to apply RF voltages to the electrodes so that the RF voltage function along the ion trap, $V_x(z)$, is as follows:

$$V_x(z) = p_1 z + p_2 z^2 \quad \text{(equation 2)}$$

Where $p_1$ and $p_2$ are the coefficients of the linear and quadratic terms.

This results in an axial pseudo-potential profile, $V_{ps}(z,m)$, given by:

$$V_{ps}(z, m) = \frac{q\left(\frac{d}{dz}[V_x(z)]\right)^2}{4Mm\omega^2} \quad \text{(equation 3)}$$

where M is the atomic mass unit, m is the mass to charge ratio of a given ion, and $\omega$ is the applied RF voltage frequency.

Let $$\alpha(\omega) = \frac{q}{4M\omega^2} \quad \text{(equation 4)}$$

Therefore, the pseudo-potential generated along the ion trap is given by:

$$V_{ps}(z, m) = \frac{\alpha(\omega)[p_1 + 2p_2 z]^2}{m} \quad \text{(equation 5)}$$

The total potential for a given mass to charge ratio m and distance z from the end of the ion trap, $V_{tot}$, is simply the sum of $V_{DC}$ and $V_{ps}$, and is therefore given by:

$$V_{tot} = d_1 z + d_2 z^2 + \frac{\alpha(\omega)[p_1 + 2p_2 z]^2}{m} \quad \text{(equation 6)}$$

Ions of any given mass to charge ratio m will be located at a distance z from the end of the ion trap, at a distance where $V_{tot}$ is a minimum for that mass. Differentiating equation 6 and solving for the minima gives equation 7 below:

$$z = -\frac{1}{2}\frac{d_1}{d_2}\left[\frac{4\alpha(\omega)\frac{p_1 p_2}{d_1} + m}{4\alpha(\omega)\frac{p_2^2}{d_2} + m}\right] \quad \text{(equation 7)}$$

This equation can be used to calculate the position z at which the pseudo-potential minimum for any given ion is located, and hence the position at which that ion will remain trapped.

For example, the curvature C(m) of the minima may be calculated from the second differential with respect to z of $V_{tot}$ in equation 6, giving:

$$C(m) = 2d_2 + \frac{8p_2^2 \alpha(\omega)}{m} \quad \text{(equation 8)}$$

As long as the value of C(m) is greater than zero then equation 7 gives the position of the minimum at which ions of a given mass to charge ratio will be trapped.

By optimisation of the DC potential parameters, $d_1$ and $d_2$, and the RF potential parameters, $p_1$ and $p_2$, it is possible to obtain reasonable voltage levels and good spatial separation of the ions within the ion trap.

As described above, this ion trap may be used to separate ion according to a physicochemical property (e.g., mass to charge ratio) in the first, second and third sets of embodiments described herein.

Various embodiments of said first set of embodiments will now be described, in which the ion trap is used in an ion filter which selectively ejects ions from one or more sections of the ion trap so that ions having only the desired values of a physicochemical property (e.g., mass to charge ratio) are onwardly transmitted.

As described above, with optimisation of the DC potential parameters, $d_1$ and $d_2$, and the RF potential parameters, $p_1$ and $p_2$, it is possible to obtain reasonable voltage levels and good spatial separation of the ions within the ion trap. In embodiments described below the optimisation of the parameters assumes an ion trap length of 0.2 m and a distribution of ions in the trap for ions having a range of mass to charge ratios of 100 to 2000 Da.

FIG. 1 shows a graph of the position z at which the total potential $V_{tot}$ is minimum as a function of ion mass to charge ratio, for ions of mass to charge ratio m between 100 and 2000 Da and for optimised values of $d_1 = -1254$ and $d_2 = -2280$ which give a maximum $V_{dc} = -150$ V; and $p_1 = -560.96$ and $p_2 = -43519.8$ which give a maximum $V_x = 400$ V, $\omega = 100$ kHz.

The ions are cooled by a buffer or background gas in the ion trap and they reach thermal energy. A worst case assumption would be that the residual axial energy $\Delta V$ of the ions was approximately ten times this value, say $\Delta V = 0.25$ eV. This assumption then allows the spatial width $\Delta z(m)$ along the z-direction of the ion trap that any given ion will reside within to be determined, i.e. $+/-0.25$ V from the central potential position.

The spatial width $\Delta z(m)$ along the ion trap in the z-direction within which ions of any given mass to charge ratio are trapped can be determined from the curvature C(m) given in equation 8 above, such that:

$$\Delta z(m) = \sqrt{\frac{8\Delta V}{C(m)}} \quad \text{(equation 9)}$$

Figure 2:
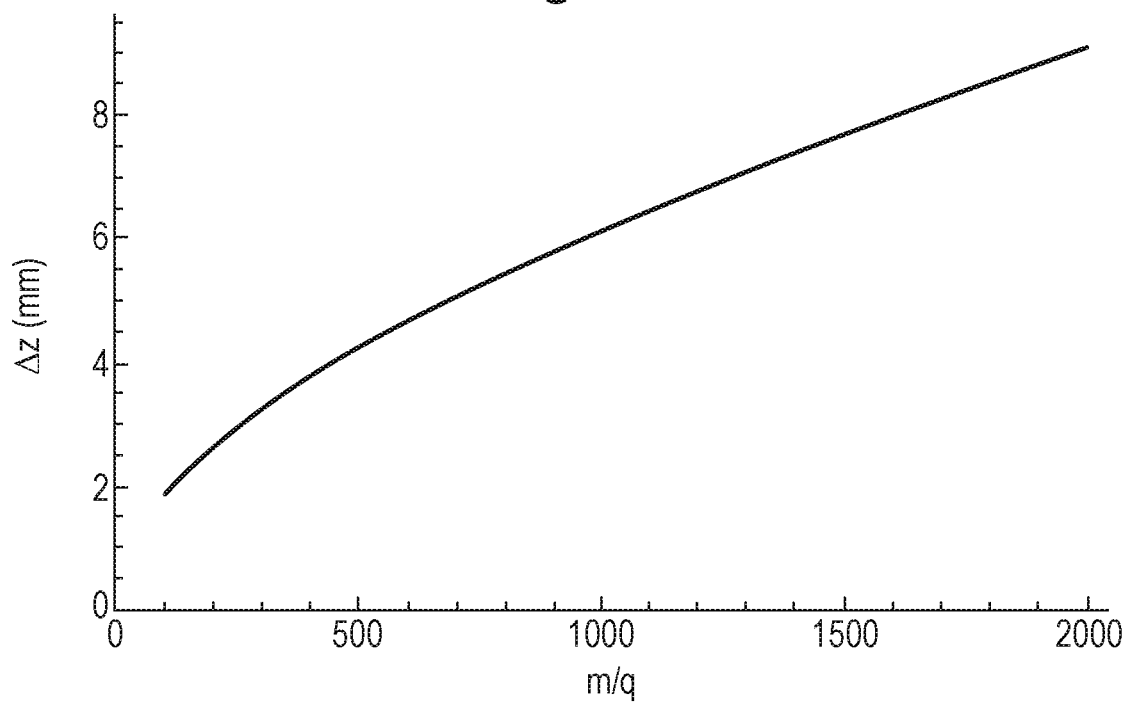
FIG. 2 shows the spatial width over which any given ion will be trapped in the ion filter device.

FIG. 2 shows this spatial width $\Delta z(m)$ as a function of the mass to charge ratio of the ions.

Figure 3:
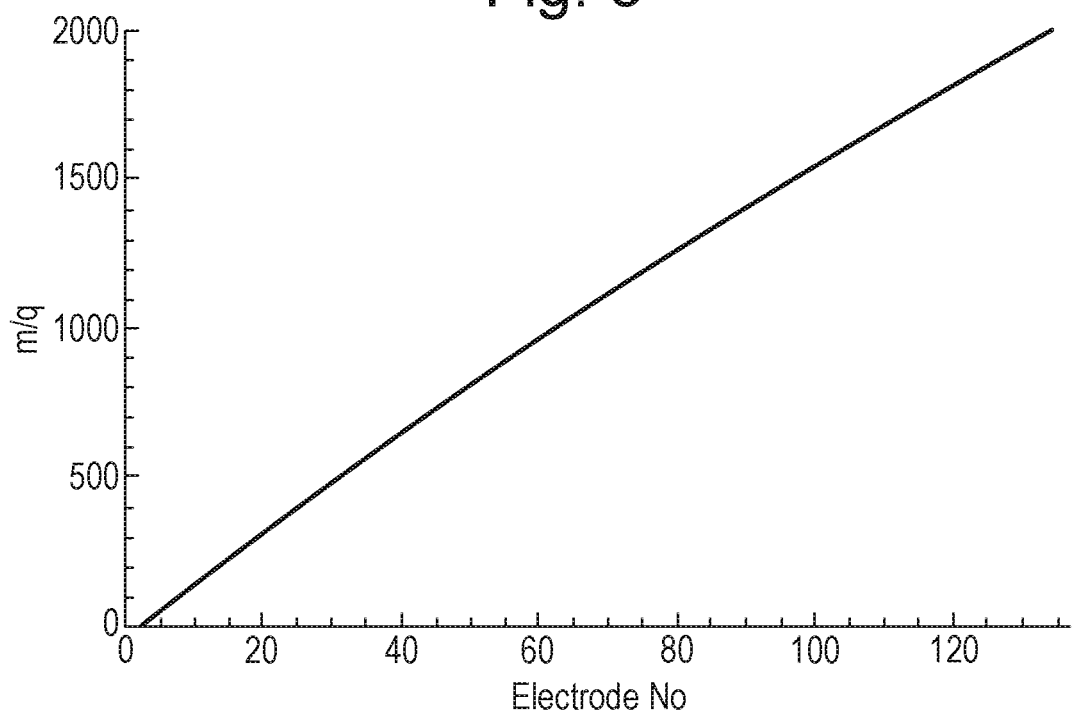
FIG. 3 shows the mass to charge ratios of the ions trapped in the filter device as a function of position in the filter.

FIG. 3 shows the mass to charge ratios of the ions in the ion guide as a function of the electrode number in the ion guide forming the ion trap, i.e. effectively as a function of the distance z along the ion trap. It can be seen that the mass to charge ratios of the ions trapped in the ion trap increase along the length of the ion trap. It can therefore be seen that ions of different mass to charge ratios can be ejected from the ion trap by ejecting ions from different regions of the length of the ion trap.

Figure 4:
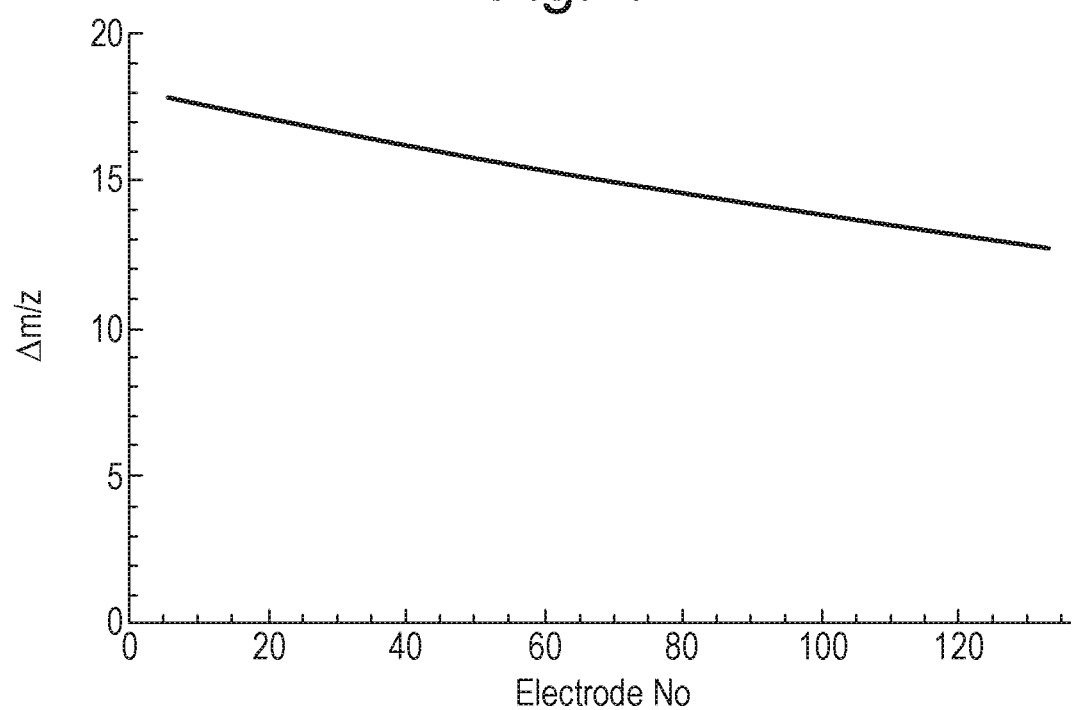
FIG. 4 shows the range of mass to charge ratios of the ions trapped in the filter device as a function of position in the filter.

FIG. 4 shows the range of mass to charge ratios that are nominally trapped adjacent each electrode in the ion trap, as a function of the electrode number in the ion trap, i.e. effectively as a function of the distance z along the ion trap. This shows a decreasing mass range with increasing distance z from the end of ion trap, with a maximum range of approximately 17 Da.

The above example uses the DC and RF voltage profiles set out in equations 1 and 2 in order to generate the illustrated mass to charge ratio profile along the ion trap. However, different choices of DC and/or RF voltage profiles may be used to tailor the mass to charge ratio distribution along the ion trap. Also, the ions may be separated within the ion trap such that they are arranged in order of increasing or decreasing mass to charge ratio by altering the arrangement of the DC and RF voltages applied the ion trap.

Figure 5:
FIG. 5 shows an embodiment of the present invention wherein ions are axially ejected from the filter device.

FIG. 5 shows a schematic of an embodiment that may be used as a high pass mass to charge ratio filter, mimicking a low mass to charge ratio cut-off device. The system comprises a source of ions 1 (e.g. electrospray, REIMS, DESI, etc.), an ion trap or ion accumulation device 2 (e.g. SRIG trap), an ion guide filter 3 comprising an ion trap for separating the ions according to mass to charge ratio (e.g., as described above), an ion neutralising/destroying device 4 (e.g. pDRE lens), and onward transmission ion optics or a mass analyser 5. Device 5 may be a mass to charge ratio analyser, such as Time of Flight (ToF) mass analyser or Orbitrap® etc. Alternatively, device 5 may be a gas filled ion guide that converts the pulsed beam received therein into a pseudo-continuous ion beam.

In use, ions from ion source 1 are accumulated in the ion trap 2 and are then pulsed into the ion filter 3. The ion filter 3 comprises an ion trap of the type described above for separating the ions. Opposing forces are applied to the ions in the ion trap so as to cause them to separate within the filter 3 according to mass to charge ratio, as described above. The ions are allowed a short period of time after being pulsed into the filter 3 (typically a few milliseconds to a few tens of milliseconds) to cool, spatially separate and take up their equilibrium spatial positions. Ions having different mass to charge ratios become arranged at different positions within the filter 3. For example, the ion distribution may be the same as that shown in FIG. 3. In this embodiment the ions are arranged in order of mass to charge ratio within the filter 3, with the lower mass ions arranged towards the exit of the filter 3. The instrument in this embodiment acts as a high pass device and it is therefore desired to discard ions below a threshold mass to charge ratio. In order to do this, a controller and associated circuitry controls a voltage supply so as to apply a DC voltage to the ion trap of the filter 3 that travels along the portion of the filter 3 in which the unwanted ions are stored so as to force these ions out of the filter 3.

The unwanted ions are swept out of the filter 3 and into the ion neutralising/destroying device 4, which at this point is activate and neutralises or destroys the unwanted ions. The ion neutralising/destroying device 4 may be adapted and configured to electronically neutralise the ions. For example, the ion neutralising/destroying device 4 may comprise a controller and associated electronic circuitry that control a voltage supply to apply a voltage to an electrode that causes the unwanted ions to be deflected onto a surface that electrically neutralises them, e.g., so that they cannot be analysed by a downstream ion analyser. For example, the ion neutralising/destroying device 4 may deflect the ion onto an electrode that electrically neutralises the ions. Alternatively, the ion neutralising/destroying device 4 may react the ions with ions of opposite polarity so as to neutralise them. The neutralising device 4 is then deactivated and the remaining, desired ions are swept out of the filter 3 by travelling a DC voltage along the filter 3. As the ion neutralising/destroying device 4 has been deactivated, the desired ions are transmitted therethrough to the device 5.

The ion neutralising/destroying device 4 may alternatively be replaced with a device that simply discards the ions. For example, a device comprising a controller and associated electronic circuitry that control a voltage supply to apply a voltage to an electrode that causes the unwanted ions to ejected from the instrument, e.g., so that they cannot be analysed by a downstream ion analyser, may be used.

As an alternative to separating and arranging the ions in the filter 3 in the above manner, the ions could be separated in the filter 3 such that the higher mass to charge ratio ions are arranged towards the exit of the filter 3. As such, a DC voltage may be travelled along the portion of the filter 3 in which the desired ions are stored so as to force these ions out of the filter 3. These desired ions may then be onwardly transmitted to device 5. Ions in the filter 3 having masses below the threshold value may be discarded, e.g. by subsequently transmitting them to the ion neutralising/destroying device 4 or ejecting them from the instrument in the manners described above. For example, the controller may switch off the trapping voltages in the filter 3 such that these unwanted ions are no longer trapped.

The instrument may alternatively be configured as a low pass filter. For example, the ions could be separated so as to be arranged in order of mass to charge ratio within the ion filter, with the lower mass ions arranged towards the exit of the filter 3. However, this embodiment is a low pass filter and so only ions below a threshold mass to charge ratio are desired. As such, a DC voltage may be travelled along the portion of the mass filter in which the desired ions are stored so as to force these ions out of the filter 3. These desired ions may then be onwardly transmitted to device 5. Ions in the filter having masses above the threshold value may be neutralised or discarded, for example, in the manners described above.

Alternatively, the ions could be separated so as to be arranged in order of mass to charge ratio within the ion filter, with the higher mass ions arranged towards the exit of the filter 3. In this embodiment, the a DC voltage is travelled along the portion of the mass filter 3 in which the unwanted ions are stored so as to force these ions out of the filter 3. These unwanted ions are neutralised or discarded, e.g. in the manners described above. The desired ions may subsequently be swept out of the filter 3 by a travelling DC potential and onwardly transmitted to device 5.

Alternatively, the device may be operated as a band pass filter. In this embodiment the ions are separated in the filter 3 in the same manner as described above. It is desired to neutralise or discard ions below a first threshold mass to charge ratio and to neutralise or discard ions above a second threshold value. If the ions are arranged in order of mass such that the low mass to charge ratios are arranged toward the exit of the filter 3, then a DC voltage is travelled along the portion of the filter 3 in which the ions having masses below the first threshold are stored so as to force these ions out of the filter 3. These ions are then neutralised or discarded, e.g. in the manners described above. A DC voltage is then travelled along the portion of the filter 3 in which the desired ions are stored, i.e. the ions having masses between the first and second threshold values. These desired ions are swept out of the filter 3 and are onwardly transmitted to device 5. Ions in the filter 3 having masses above the second threshold value may then be neutralised or discarded, e.g. in the manners described above.

Alternatively, the ions could be arranged in order of mass to charge ratio within the ion filter, with the higher mass ions arranged towards the exit of the filter 3. In this embodiment, a DC voltage is travelled along the portion of the filter 3 in which the ions having masses above the second threshold are stored so as to force these ions out of the filter 3. These unwanted ions are neutralised or discarded, e.g. in the manners described above. A DC voltage is then travelled along the portion of the filter 3 in which the desired ions are stored, i.e. the ions having masses between the first and second threshold values. These desired ions are swept out of the filter 3 and are onwardly transmitted to device 5. Ions in the filter 3 having mass to charge ratios below the first threshold value may then be neutralised or discarded, e.g. in the manners described above.

Figure 6:
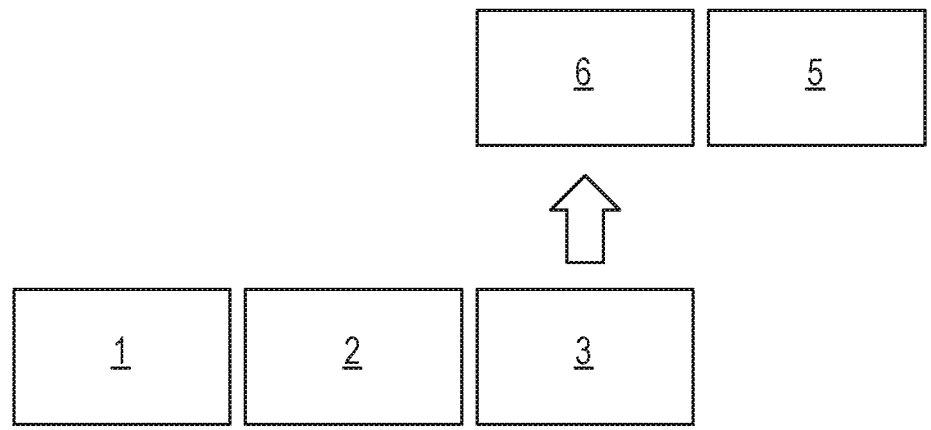
FIG. 6 shows an embodiment of the present invention wherein ions are orthogonally ejected from the filter device.

FIG. 6 shows a schematic of an instrument that is the same as that shown in FIG. 5, except wherein ions are orthogonally transferred from the ion filter 3 into an adjacent device 6, rather than being further transmitted along the longitudinal axis of the instrument. As such, the ion neutralising/destroying device 4 may be omitted and replaced by a device 6 that has a controller and associated circuitry for controlling a voltage supply to apply voltages to the ion trap so as to orthogonally eject ions from the filter 3. The device 6 may be, for example, an ion guide (such as a Stepwave® ion guide) that is conjoined with filter 3 so that ions travelling along the longitudinal axis of filter 3 may be selectively radially ejected into device 6 so as to travel along the longitudinal axis of the device 6.

The instrument may be operated in any of the modes described above in relation to FIG. 5, except that when the ions have been separated along the length of the filter 3 the desired ions may be orthogonally ejected from the filter 3 into the ion guide 6. This is in contrast to the arrangement of FIG. 5, wherein the desired ions are swept out of the filter 3 along its longitudinal axis. According to the instrument illustrated in FIG. 6, the ions received in device 6 may be onwardly transmitted to device 5.

Alternatively, rather than transferring desired ions into device 6, only unwanted ions may be transferred into the adjacent device 6. The desired ions may then be transferred along the longitudinal axis of filter 3 to an ion analyser.

The instrument may be operated both in simple filter modes in which the instrument may be operated in either low pass, high pass or band pass modes. Alternatively, the instrument may be operated in complex filter modes. For example, the instrument may be operated multi-pass filter modes in which ions are first trapped, separated and filtered according to a low pass, high pass or band pass mode in filter 3; and at least some of the desired ions transmitted by the filter 3 are subsequently reintroduced into the filter 3 and are trapped, separated and filtered again according to a low pass, high pass or band pass mode.

It is contemplated that the desired ions may be transmitted in a mass to charge ratio dependent manner to a downstream device whose operation is scanned with time. For example, the scanned device may be a resolving quadrupole or other multipole in which the mass to charge ratios transmitted by the quadrupole or multipole is scanned with time. This coupling serves to increase the duty cycle of the scanned device.

Alternatively the separated ions may be fragmented or reacted in an active collision cell and, for example, a SWATH type experiment may be conducted. For example, ions having selected mass to charge ratio ranges may be transmitted as separate pulses from the filter 3 into an active collision, fragmentation or reaction cell, where the pulse shape or separation is maintained. The collision energy or the fragmentation or reaction rate may be alternated or switched between a high collision, fragmentation or reaction value in which substantial fragmentation or reaction of the ions is performed and a low collision, fragmentation or reaction value in which substantial fragmentation or reaction of the ions is not performed. The precursor ions from the first of the modes may be mass and/or ion mobility analysed and the fragment or product ions from the second of the modes may be mass and/or ion mobility analysed. The fragment or product ions may be assigned to their respective precursor ions, e.g., based on the times that they are mass and/or ion mobility analysed or based on their ion signal intensity profile shapes.

Various embodiments of said second set of embodiments will now be described, in which the ion trap is used to separate ions and then eject the separated ions into an ion mobility separator (IMS) in a single pulse.

Figure 7A:
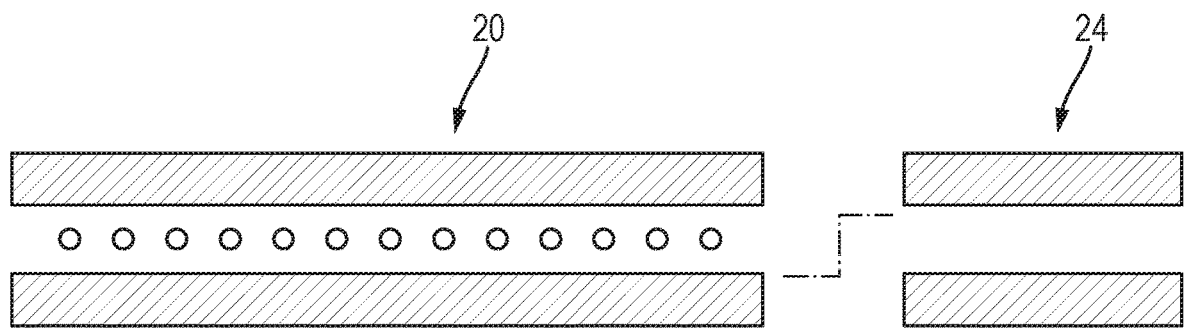
FIG. 7A shows a schematic of part of a prior art ion mobility spectrometer comprising an ion trap and an IMS device.

FIG. 7A shows a schematic arrangement of part of a prior art ion mobility spectrometer. The spectrometer comprises an ion trap 20 arranged upstream of an IMS device 24. Ions are trapped in the ion trap 20 prior to being pulsed into the IMS device 24. Prior to injection into the IMS device 24, the ions are distributed substantially throughout the entire length of the ion trapping device 20 so as to maximise the ion storage capacity.

Rokushika et al (Rokushika S, Hatano H, Bairn M A, Hill H H, Anal Chem 1985 (57) pp 1902-1907) showed that the resolution of an IMS device is dependent upon the temporal width of the ion injection pulse into the device and the diffusion broadening that occurs along the drift path within the IMS device. The resolution of an IMS device can be described the following equation:

$$R = \frac{t}{\sqrt{[W_0^2 + W_d^2]}} \quad \text{(equation 10)}$$

where t is the drift time of the ion along the drift path, $W_0$ is the initial ion pulse width, and $W_d$ is the diffusion broadened peak width.

The diffusion broadened peak width $W_d$ is given by:

$$W_d = \sqrt{\frac{16\ln(2)kTt^2}{qEL}} \quad \text{(equation 11)}$$

where k is the Boltzmann constant, T is temperature, t is the drift time of the ion along the drift path, q is the electronic charge, E is the electric field in the drift region, and L is the length of the drift region.

The prior art arrangement of providing an ion trap device 20 upstream of the IMS device 24 is advantageous in that it increases the ion population that can be injected into the IMS device 24 at any one time. However, prior to injection, ions of any given mass to charge ratio are distributed throughout the ion trap 20 and so the initial ion pulse width $W_0$ for ions of any given mass is relatively wide, resulting in a relatively low resolution for ion mobility measurement when the ions are pulsed into the IMS device.

The second set of embodiments of the present invention provide an improvement in measured ion mobility resolution through a reduction of the magnitude of $W_0$ for any given type of ion.

Figure 7B:
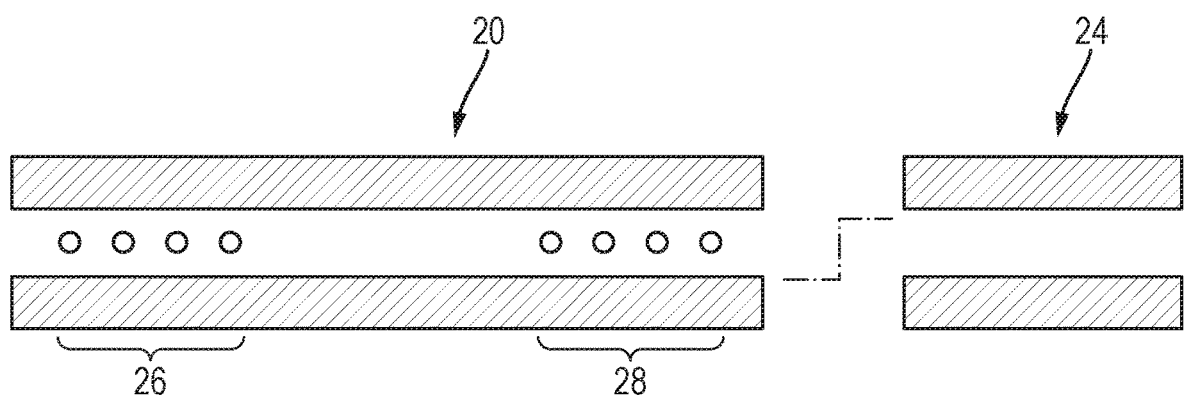
FIG. 7B shows a schematic of part of an ion mobility spectrometer according to an embodiment of the present invention comprising an ion trap and an IMS device.

FIG. 7B shows a schematic arrangement of part of an ion mobility spectrometer according to an embodiment of the present invention. The instrument is the same as that in FIG. 7A, except that it is configured to spatially separate the ions in the ion trap 20 according to their mass to charge ratio. In the illustrated example, ions of a first mass are separated to one end of the ion trap 20 and ions of another mass are separated towards the other end of the ion trap 20. Although only two groups of ions 26,28 are shown, other groups of ions of different mass to charge ratios may be separated and stored in groups that are arranged between the two illustrated groups 26,28.

As the ions are separated within the ion trap 20, ions of any given mass to charge ratio become confined within a relatively small region within the ion trap 20. As such, when the ions are injected into the IMS device 24, the initial ion pulse width $W_0$ for ions of any given mass to chare ratio is relatively narrow, even though a relatively large ion trap 20 has been used. This enables a large population of ions to be injected into the IMS device 24 without degrading the resolution of the ion mobility spectrometer. The separated ions may be injected into the IMS device 24 together in the same pulse into the IMS device 24. The injection may be performed in a manner that maintains the separation of the ions, at least to some degree, during the injection.

As described above, ions may be spatially separated in the ion trap 24 using a combination a pseudo-potential electric field and a DC electric field. As also described above, with optimisation of the DC potential parameters, $d_1$ and $d_2$, and the RF potential parameters, $p_1$ and $p_2$, it is possible to obtain reasonable voltage levels and good spatial separation of the ions within the ion trap. In the embodiments below, optimisation of the parameters assumes an ion trap length of 0.1 m and a distribution of ions in the trap for ions having a range of mass to charge ratios of 100 to 2000 Da.

Figure 8:
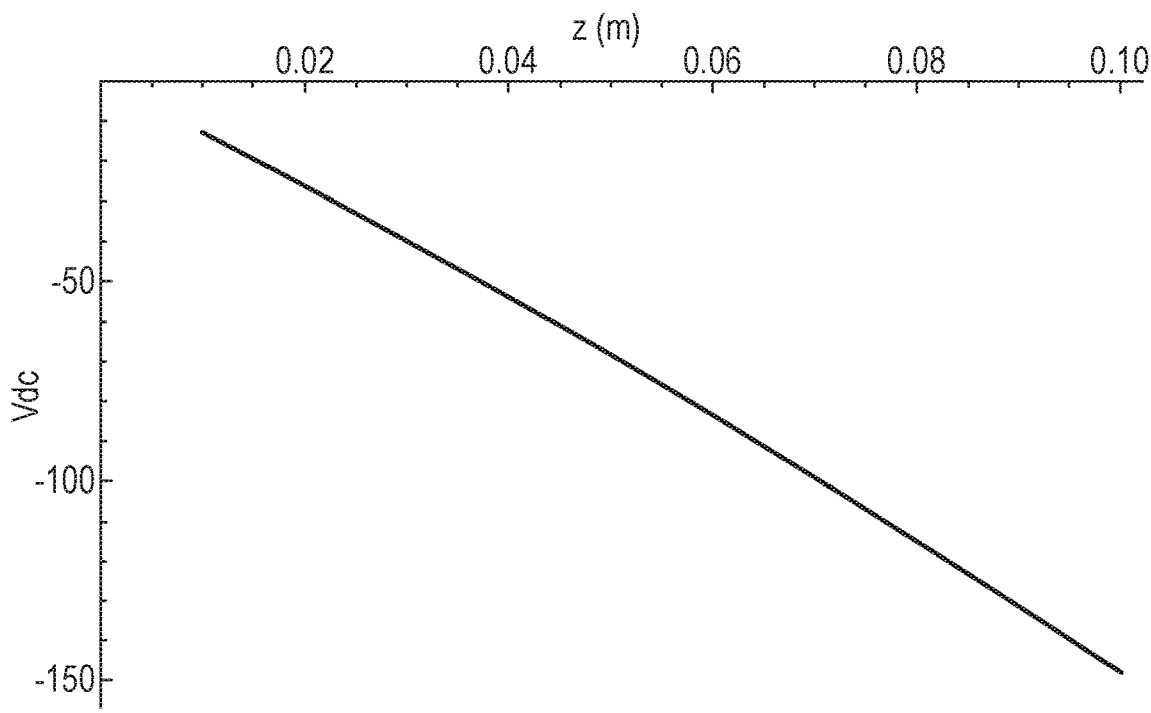
FIG. 8 shows a graph of the DC voltage potential profile along the ion trap of FIG. 7B.

FIG. 8 shows the DC voltage potential profile $V_{dc}(z)$ along the ion trap 20 achieved using values of $d_1=-1254$, $d_2=-2280$, a maximum $V_{dc}=-150$ V, and $\omega=100$ kHz.

Figure 9:
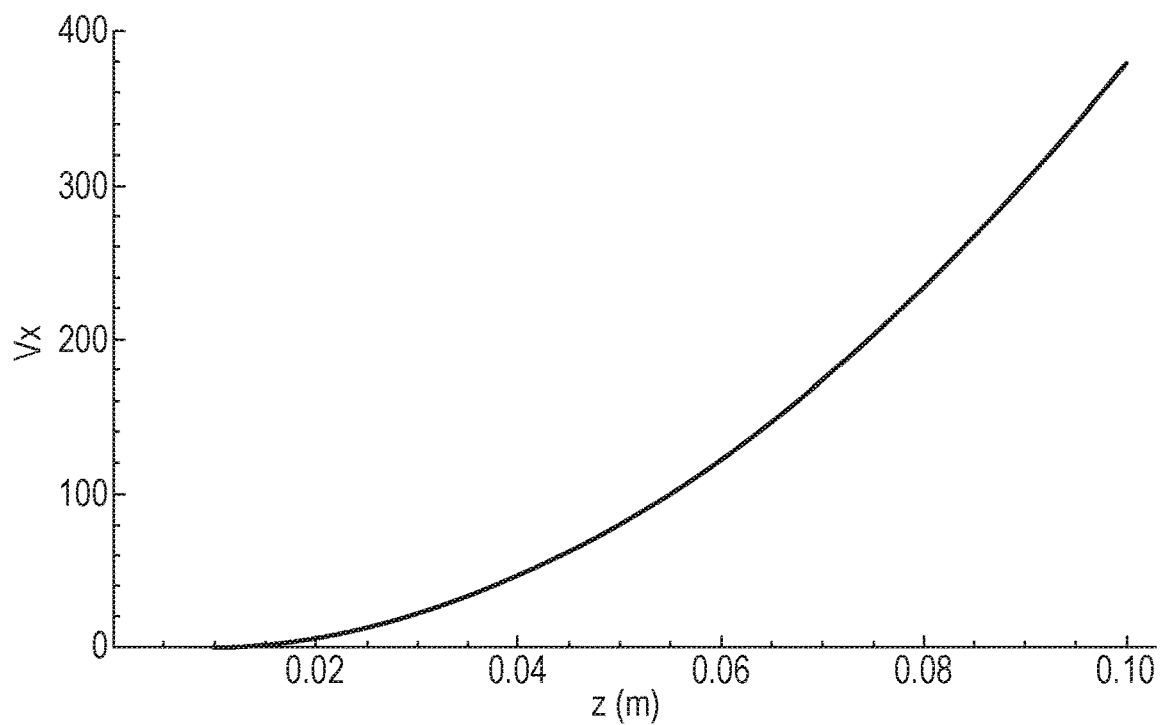
FIG. 9 shows a graph of the RF voltage potential profile along the ion trap of FIG. 7B.

FIG. 9 shows the RF voltage potential profile $V_x(z)$ along the ion trap 20 achieved using parameters $p_1=-560.96$ and $p_2=-43519.8$ and a maximum $V_x=400$ V.

Figure 10:
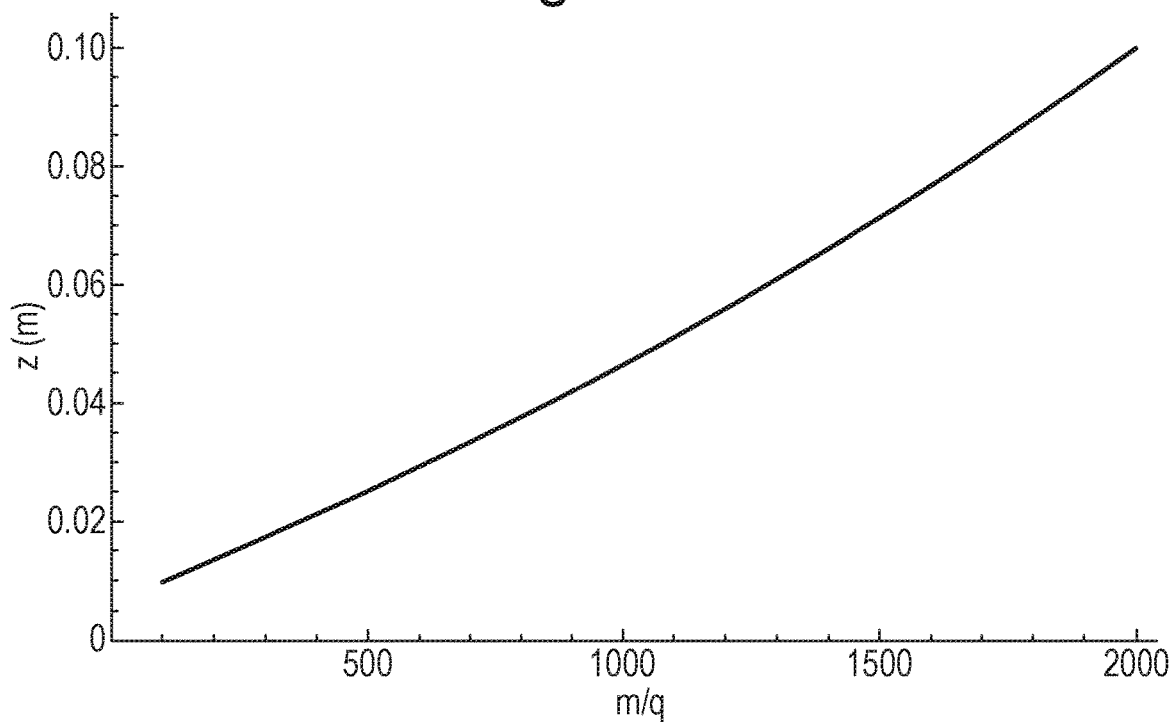
FIG. 10 shows a graph of the position along the ion trap at which the total potential is minimum for ions of different mass to charge ratios.

FIG. 10 shows a graph of the position z at which the total potential $V_{tot}$ is minimum as a function of ion mass to charge ratio, for ions of mass to charge m between 100 and 2000 Da, and for the combination voltage profiles shown in FIGS. 8 and 9.

The ions are cooled by the buffer or background gas in the ion trap 20 and they reach thermal energy. A worst case assumption would be that the residual axial energy $\Delta V$ of the ions was ten times this value, say approximately $\Delta V=0.25$ eV. This assumption then allows the spatial width $\Delta z(m)$ along the z-direction of the ion trap that any given ion will reside within to be determined from equation 9 above, i.e. $+/-0.25$ V from the central potential position.

Figure 11:
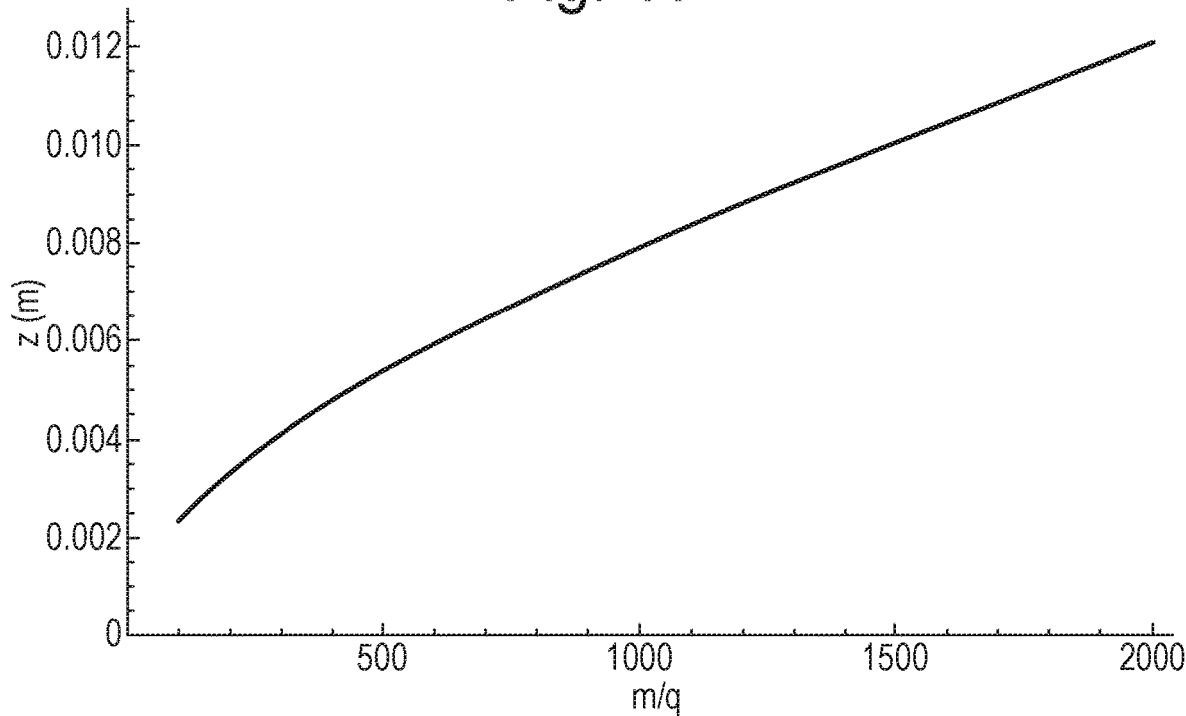
FIG. 11 shows the spatial width over which any given ion will be trapped in the ion trap of FIG. 7B.

FIG. 11 shows this spatial width $\Delta z(m)$ as a function of the mass to charge ratio of the ions.

Once the ions have been separated in the ion trap 20, the separated ions are injected into the IMS device 24. This may be performed by travelling a voltage along the ion trap 20. For example, a controller and associated circuitry may control a voltage supply so as to apply one or more voltage (e.g., a DC voltage) to the ion trap 20 that travels along the ion trap 20 so as to pulse ions from the ion trap 20 into the IMS device 24. The velocity v of the ions exiting the ion trap 20 may be controlled, e.g., by setting or controlling the velocity of the travelling voltage. For example, the velocity v is typically set to the order of 300 m/s. Therefore, the spatial spread $\Delta z$ of ions having any given mass to charge ratio may be mapped into a temporal spread $\Delta t$ of these ions leaving the ion trap 20, wherein $\Delta t = \Delta z/v$.

Figure 12:
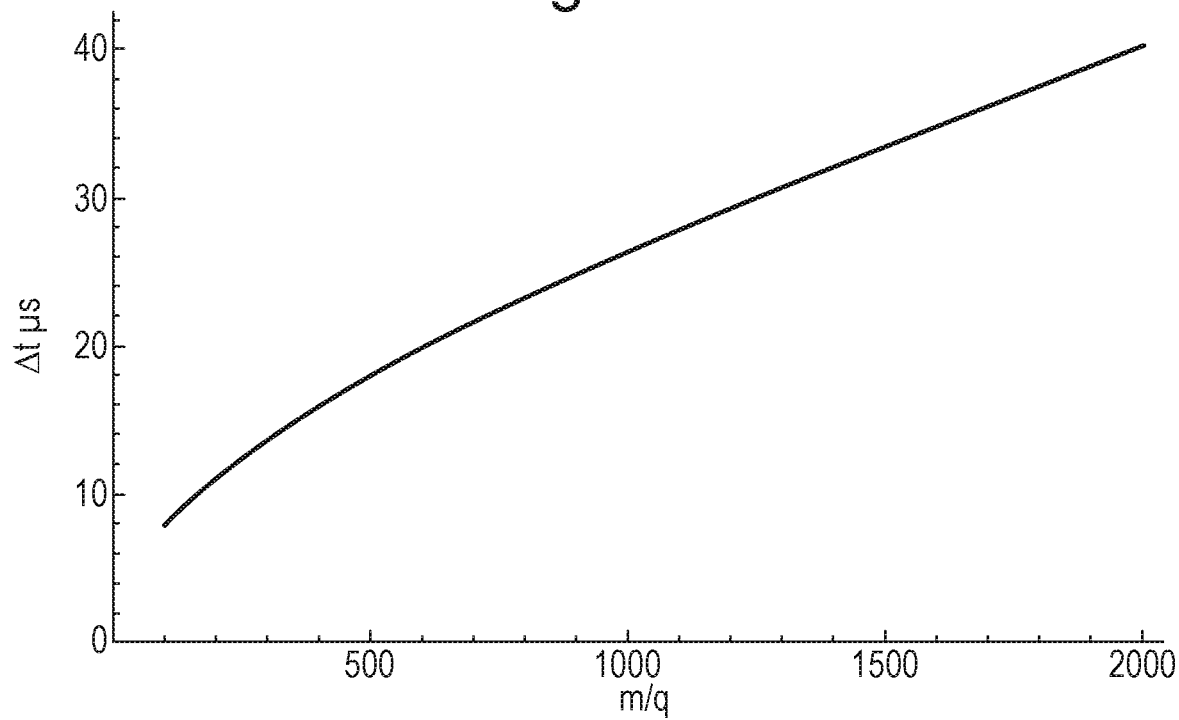
FIG. 12 shows the temporal spread over which an ion of any given mass to charge ratio will be ejected from the ion trap.

FIG. 12 shows a plot of the temporal spread of the ions $\Delta t$ as a function of mass to charge ratios of the ions.

The drift time t in equation 11 above is dependent upon the mass to charge ratio of the ions. The drift time t(m) may be calculated using the following equation:

$$t(m) = \frac{L_d}{E_d \left[ \frac{\sqrt{18\pi}}{16} \frac{q}{\sqrt{kT}} \sqrt{\frac{1}{mM} + \frac{1}{m_b M}} \frac{kT}{p} \frac{1}{\Omega(m)} \right]} \quad \text{(equation 12)}$$

where $L_d$ is the length of the ion mobility drift tube, $E_d$ is the electric field along the drift tube, p is the pressure, $m_b$ is the molecular mass of the buffer gas, and $\Omega(m)$ is the collision cross-sectional area. For simplicity, only ions of single charge have been considered here.

The collision cross-sectional area $\Omega(m)$ may be estimated by the following equation, which is based upon the molecular radii of the ion and buffer gas molecules:

$$\Omega(m) = \Pi \left[ \frac{1.436(\sqrt[3]{m} + \sqrt[3]{m_b})}{2} \right] \quad \text{(equation 13)}$$

Figure 13:
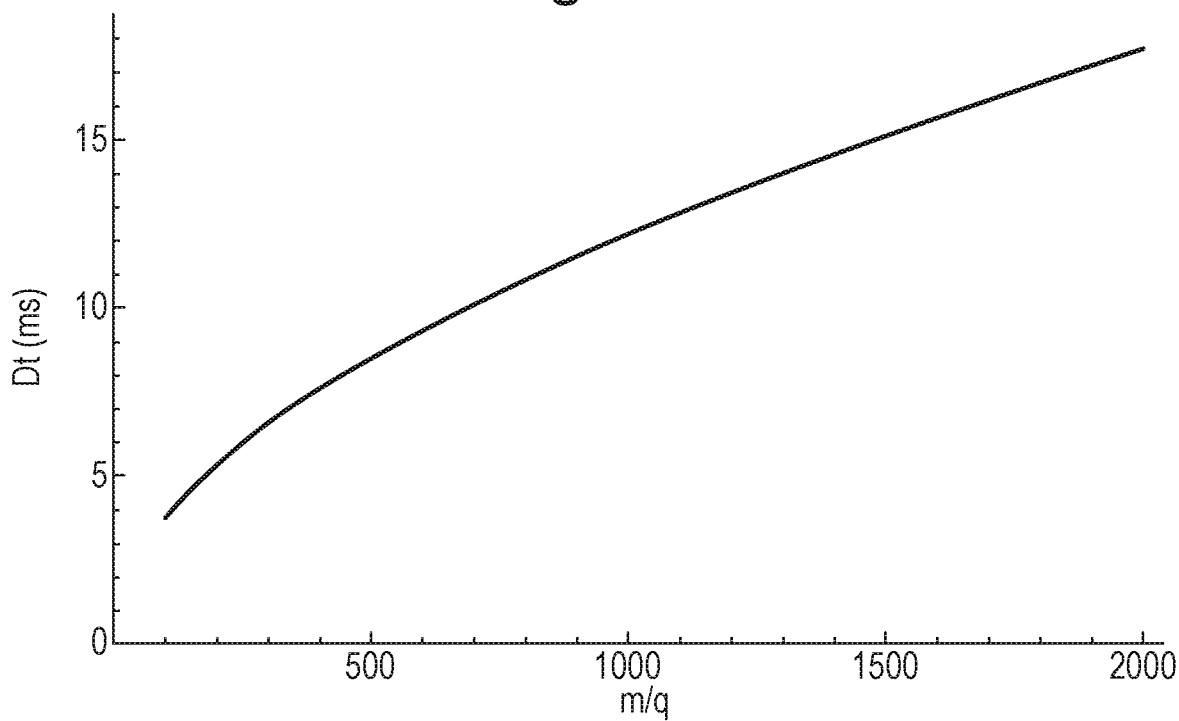
FIG. 13 shows a plot of drift time through the IMS device of FIG. 7B as a function of mass to charge ratio.

FIG. 13 shows a plot of drift time Dt as a function of mass to charge ratio. This plot was obtained using the equation for t(m) above and substituting reasonable values for the operational parameters, which were an electric field along the drift tube $E_d$ of 3 kV/m, a length of the ion mobility drift tube $L_d$ of 1 m, a temperature T of 293 K, and a pressure p of 3 mbar nitrogen.

The parameter $\Delta t$ is equivalent to the initial ion pulse width $W_o$ in equation 10 above. The diffusion broadened peak width $W_d$ may be calculated using the estimated drift times t(m) from equation 13 above. Accordingly, the resolution R may be determined from equation 10 above.

Figure 14:
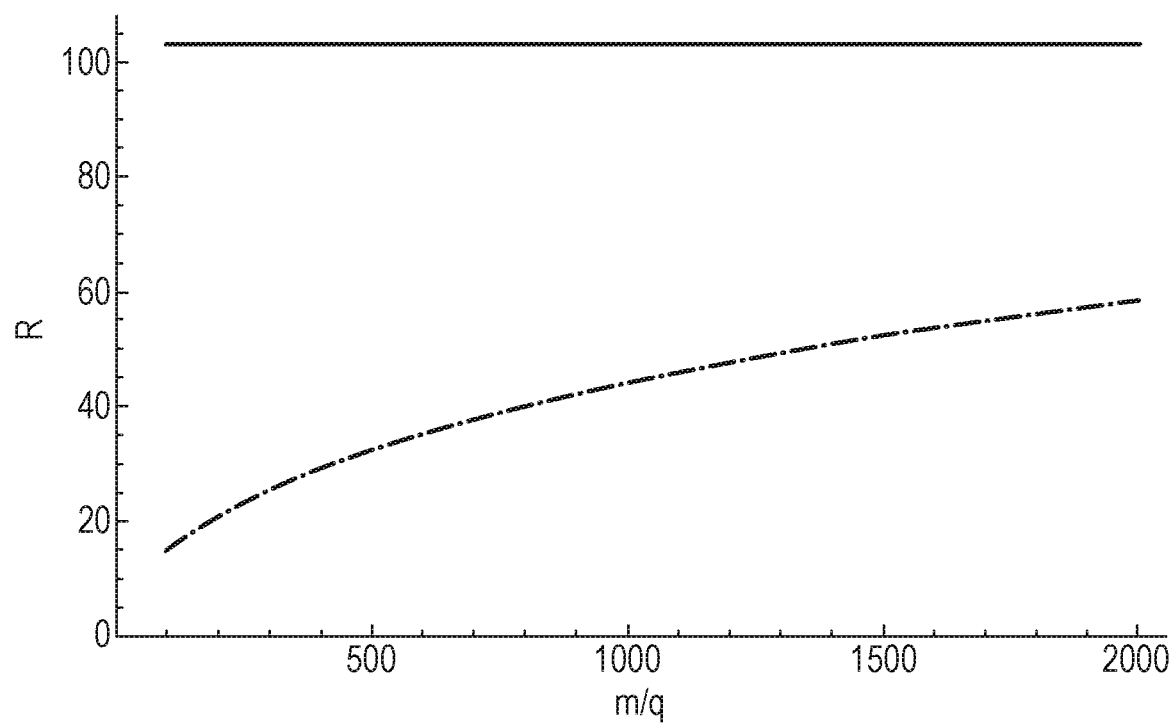
FIG. 14 shows two plots of resolution R against mass to charge ratio of the ions for the instruments of FIGS. 7A and 7B.

FIG. 14 shows two plots of resolution R against mass to charge ratio of the ions. The lower plot corresponds to that of a prior art technique that does not spatially separate the ions in the ion trap 20 (i.e. using the instrument shown in FIG. 7A) and which gates ions into the IMS device 24 using a gate time of 250 µs. In other words, the initial ion pulse width $W_o$ is 250 µs. The upper plot corresponds to an embodiment of the present invention that spatially separates the ions in the ion trap 20. FIG. 14 indicates that the embodiments of the present invention provide a significant increase in the resolution of the ion mobility spectrometer over the prior art spectrometer. The enhancement in resolution increases with decreasing ion mobility drift time. For mass to charge ratios up to 1000 Da, there is a greater than two fold enhancement in resolution. The embodiments allow ion mobility measurements to be made with high resolution, even though a large ion trap 20 is utilised to inject a large ion population into the IMS device 24 at any one time.

The embodiments introduce a mass to charge ratio dependent shift in the measured drift time, since ions of different mass to charge ratios are separated and stored in the ion trap 20 at different distances from the entrance to the IMS device 24. However, this may be easily taken care of by calibration. In addition, the pre-separation may be ion mobility dependent and may result in an increase in temporal separation.

The IMS device 24 may comprise a drift length having a static DC field arranged across it for forcing ions to separate within the IMS device 24 according to ion mobility. Alternatively, an electric potential barrier may be travelled along the drift length of the IMS device 24 in order to force the ions to separate according to ion mobility in the IMS device 24.

Various embodiments of said third set of embodiments will now be described, in which the ion trap is used to separate ions and then eject separated groups of ions into a discontinuous ion analyser at different times.

Figure 15:
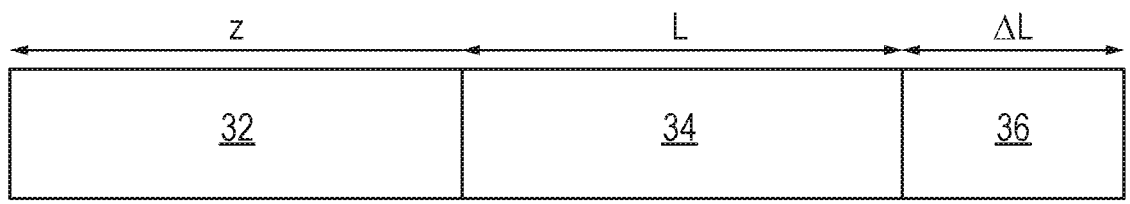
FIG. 15 shows a schematic of part of a ToF mass spectrometer.

FIG. 15 shows a schematic of part of a conventional Time of Flight (ToF) mass spectrometer. The apparatus comprises an ion trap 32 of length Z, an ion transfer region 34 of length L, and a pusher region 36 of an orthogonal acceleration time of flight (oa-ToF) mass analyser having a length $\Delta L$.

In use, ions are trapped in the ion trap 32 and are pulsed into the ion transfer region 34. Ion optics in the transfer region 34 guide the ions to the pusher region 36. The pusher region 36 pulses an orthogonal acceleration electric field such that the ions are accelerated orthogonally from their flight path and into the time of flight region of the ToF mass analyser. In order to achieve the optimum duty cycle of the oa-ToF spectrometer, all of the ions released from the trap 32 must be spatially located within the pusher region 36 when the orthogonal acceleration field is applied. The following calculations can be made to determine the mass to charge ratios of the ions that would fulfil this condition.

The time of flight $T_1$ for an ion of mass to charge ratio $m_1$ to travel from the exit of the ion trap 32 (at z=0) to the end of the pusher region 36 is as follows:

$$T_1 = \sqrt{\frac{Mm_1}{2qV_z}} (L + \Delta L) \quad \text{equation (14)}$$

where M is the atomic mass unit, q is the electronic charge constant, $V_z$ is the potential that the ion experiences on its journey through the ion transfer optics in the transfer region 34, and (L+ΔL) is the distance from the exit of the ion trapping region 32 to the end of the pusher region 36.

The time of flight $T_2$ of a second ion of higher mass to charge ratio $m_2$ to travel the distance L from the exit of the ion trapping region 32 (at z=0) to the entrance of the pusher region 36 is as follows:

$$T_2 = \sqrt{\frac{Mm_2}{2qVz}} (L) \qquad \text{equation (15)}$$

By setting time of flight $T_1$ to be equal to the time of flight $T_2$ one can determine the mass to charge ratio $m_2$ of the ions that have reached the entrance to the pusher region 36 at the same time that ions of mass to charge ratio $m_1$ have reached the exit of the pusher region 36. This results in the following equation:

$$m_2 = \left(1 + \frac{\Delta L}{L}\right)^2 m_1 \qquad \text{equation (16)}$$

In order to increase the duty cycle of the ToF mass analyser it is required that the pusher is presented with a restricted range of mass to charge ratios, otherwise all of the ions will not be located within the pusher region 36 at the time that the orthogonal acceleration extraction pulse is applied. The required range of mass to charge ratios $m_i$, $m_{i-1}$ as a function of the sequential push number i, is as follows:

$$m_i = \left(1 + \frac{\Delta L}{L}\right)^2 m_{i-1} = \left(1 + \frac{\Delta L}{L}\right)^{2(i-1)} m_1 \qquad \text{equation (17)}$$

Figure 16:
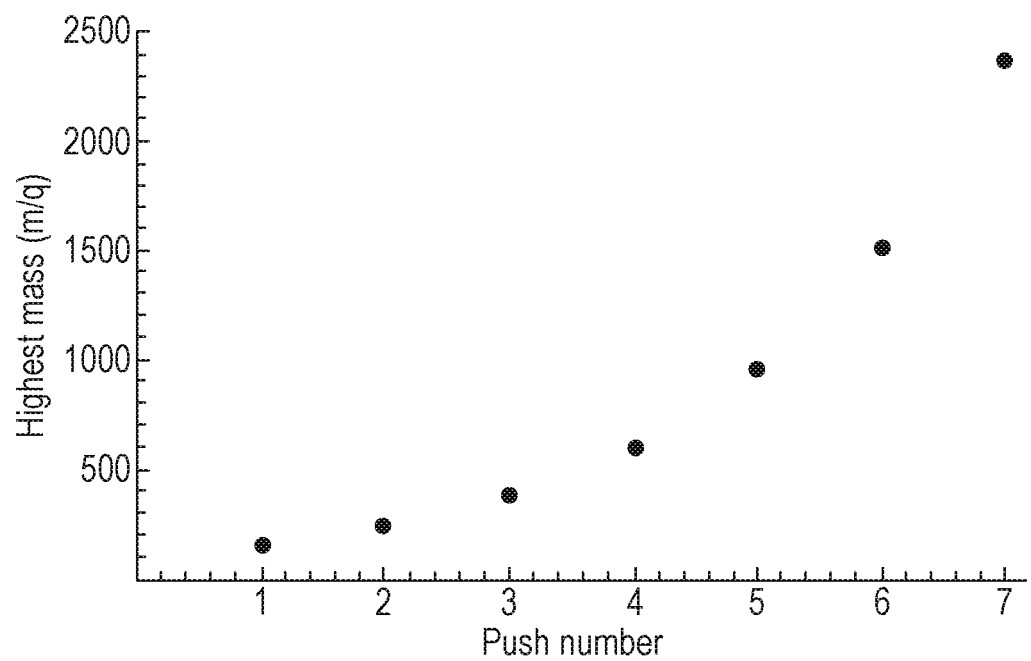
FIG. 16 shows the mass of ions analysed by the ToF mass analyser as a function of the pulse number in the pusher sequence.

FIG. 16 shows the values of $m_i$ as a function of the pulse number i for an instrument having a typical ion transfer region 34 length L and a typical pusher region 36 length ΔL. In this example the ion transfer region length L is 0.13 m, the pusher region length ΔL is 0.033 m, and the range of mass to charge ratios pulsed in the first pulse is $m_1$=100 Da.

The third set of embodiments of the present invention provide an improvement over such conventional discontinuous ion analysers by spatially separating the ions according to a physicochemical property (e.g., mass to charge ratio) in an ion trap upstream of the discontinuous ion analyser.

As described above, according to the embodiments of the present invention, ions may be spatially separated in the ion trap using a combination a pseudo-potential electric field and a DC electric field so as to provide the relationship in equation 7 above, from which can be determined the position z at which the pseudo-potential minimum for any given ion is located, and hence the position at which that ion will remain trapped.

As the ions are separated along the ion trap according to mass to charge ratio, ions may be swept out of the ion trap from different positions within the ion trap in order to eject different ranges of mass to charge ratio into the downstream ion analyser. In order to do this, a controller and associated circuitry may control a voltage supply so as to apply a DC voltage to the ion trap that travels along the ion trap so as to eject the ions into the downstream ion analyser.

Substituting $m_i$ from equation 17 above into equation 7, gives the distance along the ion trap that must be swept out by the travelling voltage in the $i_{th}$ pulse. This distance $z_i$ is given by the following equation:

$$z_i = -\frac{1}{2}\frac{d_1}{d_2}\left[\frac{4\alpha(\omega)\frac{p_1 p_2}{d_1} + \left(1 + \frac{\Delta L}{L}\right)^{2(i-1)} m_1}{4\alpha(\omega)\frac{p_2^2}{d_2} + \left(1 + \frac{\Delta L}{L}\right)^{2(i-1)} m_1}\right] \qquad \text{(equation 18)}$$

As described above, with optimisation of the DC potential parameters, $d_1$ and $d_2$, and the RF potential parameters, $p_1$ and $p_2$, it is possible to obtain reasonable voltage levels and good spatial separation of the ions within the ion trap.

Figure 17:
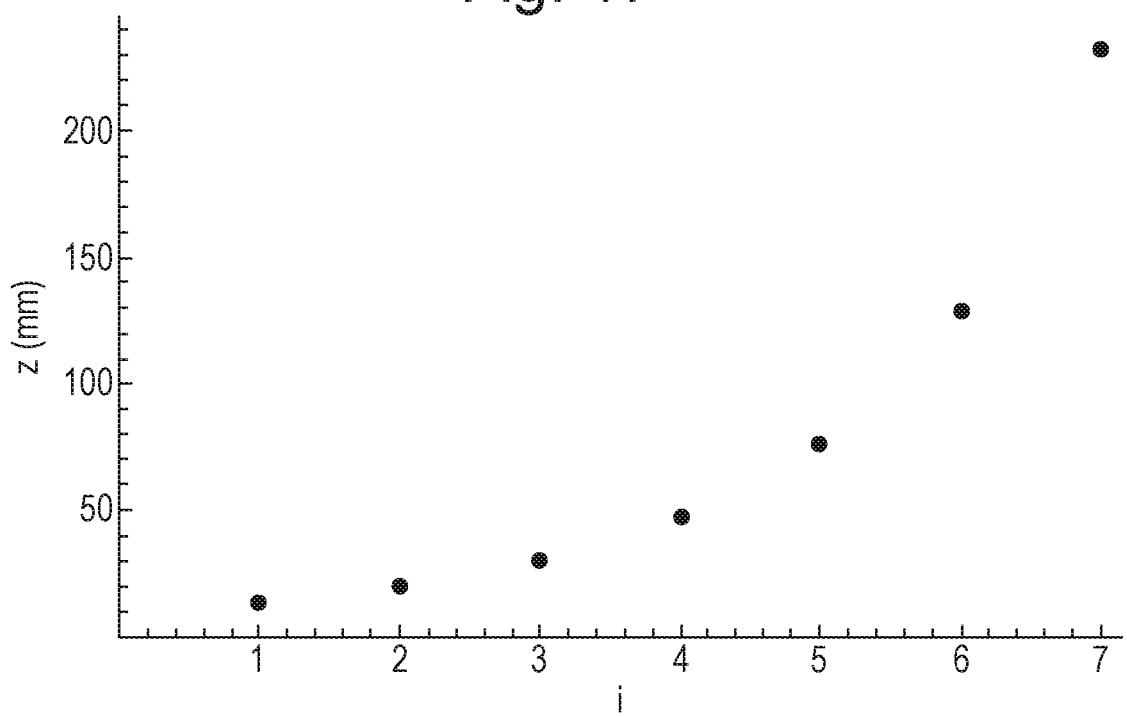
FIG. 17 shows the position along the ion trap from which ions are swept out of, as a function of the pulse number in the pusher sequence.

FIG. 17 shows the position $z_i$ along the ion trap from which the travelling voltage sweeps ions towards the exit of the ion trap (wherein the exit is at z=0) as a function of push number i, for pushes i between i=1 and i=7. In this model, the length of the ion trapping device is 0.2 m and ω=100 kHz. Optimised values for the DC voltage gave $d_1$=−2425 and $d_2$=−2280, with a maximum of −300 V and the RF voltage $p_1$=−270 and $p_2$=43272 and shows a maximum of approximately 400 V.

As can be seen from FIG. 17, the distance that the travelling voltage must travel along the ion trap increases in subsequent push numbers. This enables ions from different depths within the ion trap to be received in the pusher region 36 of the ToF mass analyser when different orthogonal acceleration pulses are applied. As ions having different ranges of mass to charge ratio are trapped at different depths in the ion trap (i.e. different values of z), ions having different ranges of mass to charge ratio are analysed in the different orthogonal acceleration pulses.

Figure 18:
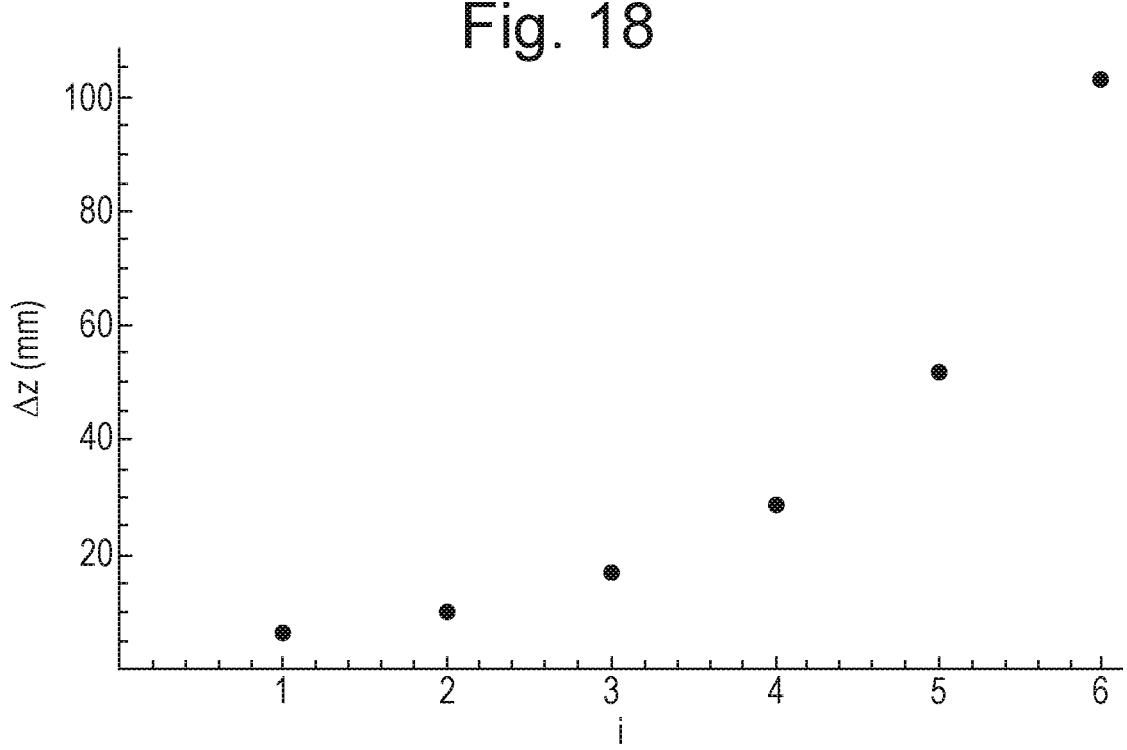
FIG. 18 shows the length of the region of the ion trap from which ions are extracted, as a function of the pulse number in the pusher sequence.

FIG. 18 shows the length Δz of the ion trap that both contains trapped ions and from which ion are extracted, as a function of the ToF push number i. It can be seen that the ions trapped over a small length (e.g. 6 mm) of the ion trap are swept into the pusher region for the first push at i=1. The next sweep extracts ions trapped over a larger length of the ion trap, such that these ions are swept into the pusher region for the second push at i=2. It will be seen that subsequent sweeps extract ions that were trapped over progressively increasing lengths of the ions trap. FIG. 18 shows data that would cover a mass range between 1 and approximately 2000 Da, requiring a minimum sweep of approximately 6 mm of ion guide and thus is entirely possible with current technologies.

The third set of embodiments of the invention enables ions having a relatively large range of mass to charge ratios to be trapped in the ion trap 32, without the ions being ejected from the ion trap 32 and into the pusher region 36 in a manner that overfills the pusher region 36 at the time the orthogonal acceleration extraction pulse is applied. By spatially separating the ions within the ion trap, ions of any given range of mass to charge ratios become confined within a sub-region (which may be a relatively small region) of the ion trap. Different ranges of mass to charge ratios may then be swept out of the ion trap and into the mass analyser at different times by ejecting ions from different regions of the ion trap at different times.

Figure 19:
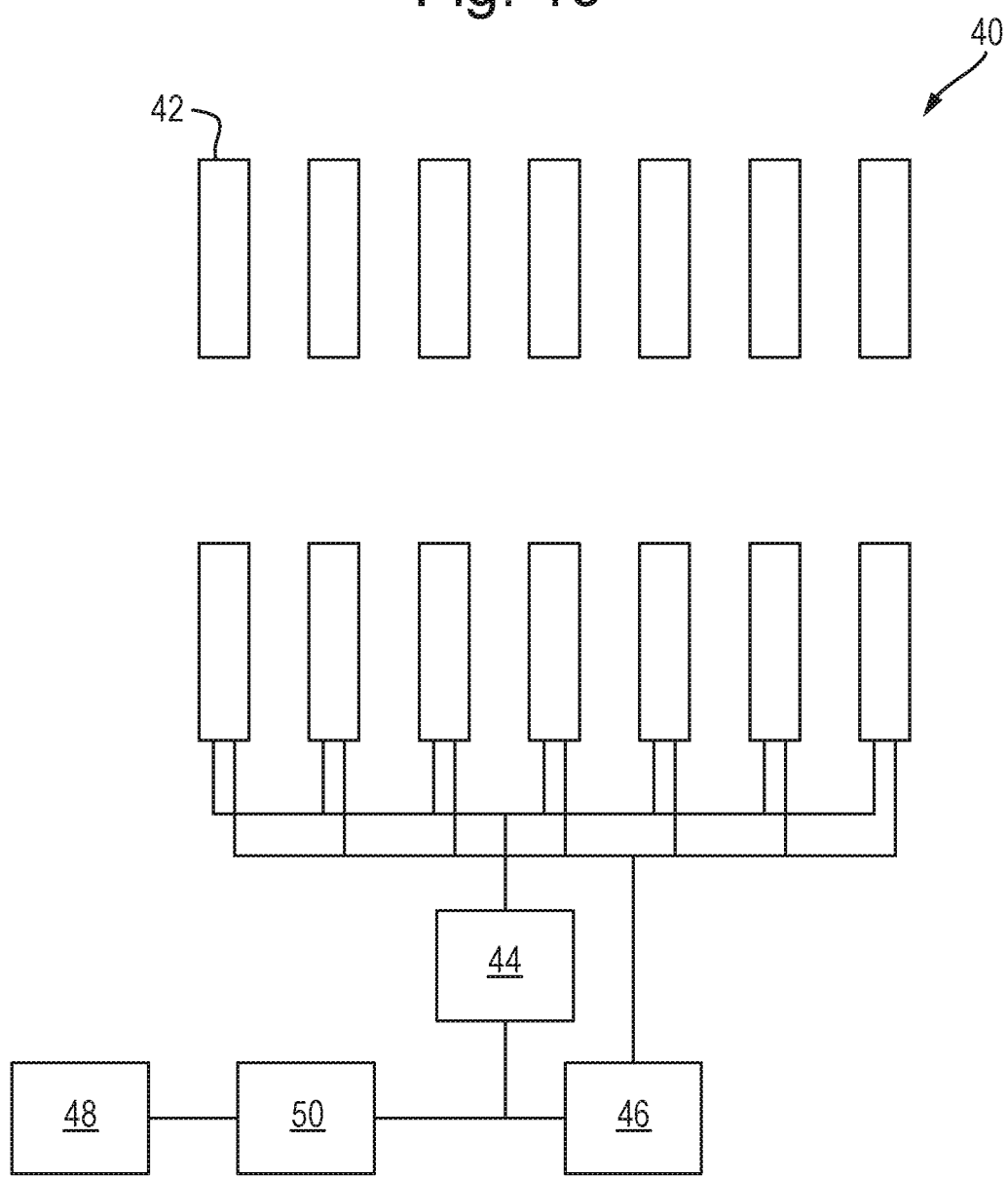
FIG. 19 shows a schematic of an ion trap according to an embodiment of the invention.

FIG. 19 shows an embodiment of the ion trap 40 that may be used in the various embodiments described herein. The ion trap 40 may be a linear ion trap and comprises a plurality of apertured electrodes 42. An AC or RF voltage supply 44 may apply AC or RF voltages to the electrodes 42 so as to radially confine ions within the ion trap 40. Opposite phases of an AC or RF voltage may be applied to axially adjacent electrodes. Different AC or RF voltages (e.g., different magnitudes) may be applied to different electrodes 42 along the ion trap 40 so as to generate a first force on the ions in a first direction along the axial length of the ion trap 40. A DC voltage supply 46 may apply DC voltages to the electrodes 42. Different DC voltages (e.g., different magnitudes) may be applied to different electrodes 42 along the ion trap 40 so as to generate a second force on the ions in a second direction along the axial length of the ion trap 40, opposite to the first direction. Additionally, or alternatively, a pump 48 may be provided to generate a gas flow through the ion trap 40 that generates a force on the ions in the second direction.

A controller 50 is provided that comprises an ion separator. The controller and ion separator contain a processor and electronic circuitry that are configured to control the voltage supplies 44,46 (and/or pump 48) so as to apply the voltages to the electrodes 42 (and/or pump the gas through the ion trap 42) that cause the first and second forces to be generated on the ions. This causes the ions to separate along the axial length of the ion trap 40 according to mass to charge ratio, as described above.

The controller 50 also comprises an ion driving or pulsing circuit that contain a processor and electronic circuitry configured to control the voltage supplies 44,46 (and/or pump 48) so as to apply voltages to the electrodes 42 (and/or control the gas supply) to cause ions to be driven or pulsed out of the ion trap, after they have been separated.

Although the present invention has been described with reference to various embodiments, it will be understood by those skilled in the art that various changes in form and detail may be made without departing from the scope of the invention as set forth in the accompanying claims.

For example, although a stacked ring ion guide has been described as being used in the ion trap, other geometries of electrodes may be used.

Although a travelling wave has been described as the means by which ions are extracted from the trap, alternative methods of releasing the ions from the ion trap in a controlled manner may be used. For example, the axial DC potential or pseudo-potential gradient may be ramped so as to force ions out of the ion trap, or may be altered along different lengths of the ion trap at different times so as to eject ions.

Although the spatial separation has been described as being achieved by using opposing forces on the ions generated by pseudo-potential and an opposing DC potential, the spatial separation may be achieved by other methods. For example, one of the opposing forces may be applied from a gas flow instead of the DC potential or pseudo-potential gradient.

Although various values of the RF and DC voltages have been described herein, these parameters and other operational parameters of the ion trap may be varied according to the desired mode of operation and/or the ions trapped therein.

The ions may be caused to separate in the ion trap by ion mobility instead of mass to charge ratio, or by a combination of mass to charge ratio and ion mobility.

The ion trap of the various embodiments may be a discrete device or may be an ion trapping region, e.g., within a larger device.

The invention claimed is:

1. A method of filtering ions according to at least one physicochemical property, comprising:
(i) trapping ions in a linear ion trap;
(ii) spatially separating the ions along a longitudinal axis of the ion trap according to said at least one physicochemical property by applying a first force on the ions within the ion trap in a first direction, wherein said physicochemical property is mass-to-charge ratio, said force having a magnitude that is dependent upon a value of said at least one physicochemical property of the ions, and applying a second force on these ions in the opposite direction, such that said first and second forces are counterbalanced at different locations within the ion trap for ions having different values of said physicochemical property and such that the axial motion of said ions is stopped such that said ions having different values of said physicochemical property are trapped within separate, different axial regions of the ion trap according to a known, determined or estimated physicochemical property distribution;
(iii) performing said step of spatially separating the ions within the ion trap;
(iv) selecting a desired first value, or first range of values, of said physicochemical property for first ions desired to be ejected from the ion trap;
(v) determining an axial distance along the longitudinal axis of the ion trap at which said first ions are located from said known, determined or estimated physicochemical property distribution, wherein the axial distance is not at an end of the linear ion trap; and then
(vi) driving said first ions out of the ion trap after performing step (v).

2. The method of claim 1, wherein ions of interest having the selected value, or range of values, of said physicochemical property are ejected from the ion trap and transmitted to an ion analyser or ion storage device and wherein unwanted ions having a value, or range of values, of said physicochemical property that are not of interest are ejected from the ion trap and discarded or neutralised.

3. The method of claim 1, wherein the ion trap has an ion trapping region having a longitudinal axis and wherein the ions are driven out of a region that is not directly adjacent an exit at a longitudinal end of the ion trapping region.

4. The method of claim 1, wherein the ion trap is an elongated ion trap and the step of driving said first ions out of the ion trap is performed by radially ejecting the first ions from the ion trap.

5. A method of mass spectrometry comprising:
trapping ions in a linear ion trap; and then
spatially separating the ions along a longitudinal axis of the ion trap according to mass to charge ratio so that ions having different values of mass to charge ratio are trapped in separate, different axial regions of the ion trap, wherein said step of spatially separating the ions comprises applying a first force on the ions within the ion trap in a first direction, said force having a magnitude that is dependent upon the value of said mass to charge ratio of the ions, and applying a second force on these ions in the opposite direction; wherein said first and second forces are counterbalanced at different locations within the ion trap for ions having different values of mass to charge ratio such that said ions having different values of mass to charge ratio are axially stopped and trapped within separate, different, axial regions of the ion trap; and then
driving or pulsing first trapped ions having a first mass to charge ratio out of a first of said axial regions of the ion trap and into a discontinuous ion analyser at a first time, whilst retaining other ions trapped in their respective separate, different, axial regions in the ion trap;

analysing said first ions in a first cycle of said discontinuous ion analyser;

driving or pulsing second trapped ions having a second mass to charge ratio out of a second, different one of said axial regions of the ion trap and into the discontinuous ion analyser at a second, subsequent time, whilst retaining other ions trapped in their respective separate, different, axial regions in the ion trap, wherein said second axial region is further away from an exit of the ion trap than the first axial region from which said first ions are driven or pulsed; and analysing said second ions in a different cycle of said discontinuous ion analyser; wherein the discontinuous ion analyser is a Time of Flight mass analyser, wherein all of the ions driven or pulsed out of the ion trap at the first time are analysed in said first cycle, and wherein all of the ions driven or pulsed out of the ion trap at the second time are analysed in said second cycle.

6. The method of claim 5, wherein each of the steps of driving or pulsing trapped ions out of a region of the ion trap and into a discontinuous ion analyser, whilst retaining other ions trapped in the ion trap, comprises travelling an electric potential along at least a portion of the ion trap so as to drive the ions out of the ion trap, wherein said electric potential is traveled along a first length of the ion trap in order to drive said first ions out of the ion trap, and said electric potential is subsequently traveled along a second, different length of the ion trap in order to drive said second ions out of the ion trap.

7. The method of claim 6, wherein the first length extends from a first location in the ion trap to the exit of the ion trap, whereas the second length extends from a second location in the ion trap to the exit of the ion trap, wherein the second location is further from the exit than the first location.

8. The method of claim 5, wherein said step of driving or pulsing first trapped ions out of the ion trap comprises driving or pulsing ions axially out of the ion trap; and wherein said step of driving or pulsing second trapped ions out of the ion trap comprises driving or pulsing ions axially out of the ion trap.

9. A device configured to perform the method of claim 1, comprising:
an ion separator;
an ion driving device; and
a controller configured to:
control the ion trap to trap ions therein;
control the ion separator so as to spatially separate the ions within the ion trap according to said at least one physicochemical property so that ions having different values of said physicochemical property are trapped in different regions of the ion trap according a known, determined or estimated physicochemical property distribution;
determine a first region of the ion trap in which ions having a preselected first value, or first range of values, of said physicochemical property are located based on said physicochemical property distribution; and then
to control the ion driving device so as to drive first ions trapped in said first region out of the ion trap.

10. An ion trap for spatially separating ions according to mass to charge ratio, wherein the ion trap comprises:
a plurality of electrodes;
at least one AC or RF voltage supply;
at least one DC voltage supply; and
a controller and circuitry arranged and configured to:
control the at least one AC or RF voltage supply so as to apply one or more AC or RF voltages to said electrodes so as to generate a pseudo-potential electric field that urges ions in a first direction;
control the at least one DC voltage supply so as to apply one or more DC voltages to said electrodes so as to generate a DC electric field that urges ions in a second direction opposite to the first direction; and
control the DC voltage supply and/or AC/RF voltage supply so as to pulse or drive ions out of one or more regions of the ion trap;
wherein the ions are spatially separated within the ion trap according to mass to charge ratio so that the ions are dispersed along the ion trap according to their mass to charge ratio values without the spatially separated trapped ions being separated by potential barriers; and
control the DC voltage supply and/or AC/RF voltage supply to perform a plurality of cycles of operation, wherein each cycle comprises:
driving or pulsing trapped ions out of a trapping region of the ion trap, whilst retaining other ions trapped in other trapping regions of the ion trap in their respective trapping regions;
wherein for each cycle of operation subsequent to a first cycle of operation, ions are driven or pulsed out of the ion trap from a trapping region that is further away from an exit of the ion trap than a trapping region from which ions were driven out in a previous cycle of operation.

11. The ion trap of claim 10, wherein said controller and circuitry are configured to control said AC or RF voltage supply and said DC voltage supply such that said pseudo-potential electric field and said DC electric field are counterbalanced at different locations within the ion trap for ions having different values of mass to charge ratio such that said ions having different values of mass to charge ratio are axially stopped and trapped within separate, different, axial regions of the ion trap.

* * * * *